United States Patent
Widmer et al.

(10) Patent No.: US 12,351,046 B2
(45) Date of Patent: Jul. 8, 2025

(54) WIRELESS POWER ANTENNA ALIGNMENT ADJUSTMENT SYSTEM FOR VEHICLES

(71) Applicant: WiTricity Corporation, Midway, GA (US)

(72) Inventors: Hans Peter Widmer, Wohlenschwil (CH); Nigel P. Cook, El Cajon, CA (US); Lukas Sieber, Olten (CH)

(73) Assignee: WiTricity Corporation, Midway, GA (US)

( * ) Notice: Subject to any disclaimer, the term of this patent is extended or adjusted under 35 U.S.C. 154(b) by 0 days.

(21) Appl. No.: 18/539,072

(22) Filed: Dec. 13, 2023

(65) Prior Publication Data
US 2024/0109437 A1    Apr. 4, 2024

Related U.S. Application Data

(60) Continuation of application No. 17/582,651, filed on Jan. 24, 2022, now Pat. No. 11,938,830, which is a
(Continued)

(51) Int. Cl.
*H02J 7/00* (2006.01)
*B60L 3/00* (2019.01)
(Continued)

(52) U.S. Cl.
CPC ............ *B60L 53/11* (2019.02); *B60L 3/0069* (2013.01); *B60L 3/04* (2013.01); *B60L 53/12* (2019.02); *B60L 53/126* (2019.02); *B60L 53/22* (2019.02); *B60L 53/30* (2019.02); *B60L 53/37* (2019.02); *B60L 53/38* (2019.02); *B60L 53/66* (2019.02);
(Continued)

(58) Field of Classification Search
None
See application file for complete search history.

(56) References Cited

U.S. PATENT DOCUMENTS

| | | | |
|---|---|---|---|
| 4,800,328 | A | 1/1989 | Bolger et al. |
| 5,162,963 | A | 11/1992 | Washburn et al. |

(Continued)

FOREIGN PATENT DOCUMENTS

| | | |
|---|---|---|
| CN | 101667754 | 3/2010 |
| DE | 10325246 B3 | 11/2004 |

(Continued)

OTHER PUBLICATIONS

Li B., et al., "Design of Constant Voltage Compensation Topology Applied to WPT System for Electrical Vehicles," IEEE Vehicle Power and Propulsion Conference, Oct. 17-20, 2016, pp. 1-6.

(Continued)

*Primary Examiner* — Arun C Williams
(74) *Attorney, Agent, or Firm* — Knobbe, Martens, Olson & Bear, LLP

(57) ABSTRACT

Exemplary embodiments are directed to wireless charging and wireless power alignment of wireless power antennas associated with a vehicle. A wireless power charging apparatus includes an antenna including first and second orthogonal magnetic elements for detecting a horizontal component of a magnetic field generated from a second charging base antenna. A processor determines a directional vector between the antennas.

19 Claims, 36 Drawing Sheets

Related U.S. Application Data continuation of application No. 16/897,644, filed on Jun. 10, 2020, now abandoned, which is a continuation of application No. 16/427,139, filed on May 30, 2019, now Pat. No. 11,491,882, which is a division of application No. 13/082,229, filed on Apr. 7, 2011, now Pat. No. 10,343,535.

(60) Provisional application No. 61/322,196, filed on Apr. 8, 2010, provisional application No. 61/322,214, filed on Apr. 8, 2010, provisional application No. 61/322,221, filed on Apr. 8, 2010.

(51) Int. Cl.
| | |
|---|---|
| *B60L 3/04* | (2006.01) |
| *B60L 53/10* | (2019.01) |
| *B60L 53/12* | (2019.01) |
| *B60L 53/126* | (2019.01) |
| *B60L 53/22* | (2019.01) |
| *B60L 53/30* | (2019.01) |
| *B60L 53/37* | (2019.01) |
| *B60L 53/38* | (2019.01) |
| *B60L 53/66* | (2019.01) |
| *B60L 53/68* | (2019.01) |

(52) U.S. Cl.
CPC ........... *B60L 53/68* (2019.02); *B60L 2200/26* (2013.01); *B60L 2210/30* (2013.01); *B60L 2210/40* (2013.01); *B60L 2270/147* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(56) References Cited

U.S. PATENT DOCUMENTS

| | | | |
|---|---|---|---|
| 5,399,955 A | 3/1995 | Glaser et al. | |
| 5,498,948 A * | 3/1996 | Bruni | B60L 53/126 320/108 |
| 5,515,285 A | 5/1996 | Garrett et al. | |
| 5,568,036 A | 10/1996 | Hulsey et al. | |
| 5,573,090 A | 11/1996 | Ross | |
| 5,617,003 A | 4/1997 | Odachi et al. | |
| 5,654,621 A | 8/1997 | Seelig | |
| 5,659,240 A | 8/1997 | King | |
| 5,710,502 A | 1/1998 | Poumey | |
| 5,821,731 A | 10/1998 | Kuki et al. | |
| 5,959,410 A | 9/1999 | Yamauchi et al. | |
| 5,982,645 A | 11/1999 | Levran et al. | |
| 6,330,176 B1 | 12/2001 | Thrap et al. | |
| 6,465,990 B2 | 10/2002 | Acatrinei et al. | |
| 6,548,985 B1 | 4/2003 | Hayes et al. | |
| 6,934,167 B2 | 8/2005 | Jang et al. | |
| 6,960,968 B2 | 11/2005 | Odendaal et al. | |
| 7,375,994 B2 | 5/2008 | Andreycak | |
| 7,382,112 B2 | 6/2008 | Krein | |
| 7,543,780 B1 | 6/2009 | Marshall et al. | |
| 7,839,023 B2 | 11/2010 | Jacobson et al. | |
| 7,880,334 B2 | 2/2011 | Evans et al. | |
| 7,990,117 B2 | 8/2011 | Benedict | |
| 8,294,427 B2 | 10/2012 | Inoue et al. | |
| 8,531,059 B2 | 9/2013 | Ichikawa et al. | |
| 8,587,154 B2 | 11/2013 | Fells et al. | |
| 8,953,340 B2 | 2/2015 | Boys | |
| 9,561,730 B2 | 2/2017 | Widmer et al. | |
| 10,343,535 B2 | 7/2019 | Widmer et al. | |
| 11,491,882 B2 | 11/2022 | Widmer et al. | |
| 2002/0019193 A1 | 2/2002 | Maggiore et al. | |
| 2002/0126515 A1 | 9/2002 | Boeke | |
| 2002/0143442 A1 | 10/2002 | Uehara | |
| 2002/0175784 A1 | 11/2002 | Yamashita et al. | |
| 2002/0196193 A1 | 12/2002 | Butler et al. | |
| 2003/0030411 A1 | 2/2003 | Ayano et al. | |
| 2004/0101725 A1 * | 5/2004 | Kato | B60L 50/71 429/413 |
| 2004/0145342 A1 | 7/2004 | Lyon | |
| 2005/0151517 A1 | 7/2005 | Cook et al. | |
| 2005/0243522 A1 | 11/2005 | Nilsen et al. | |
| 2006/0103341 A1 | 5/2006 | Steigerwald et al. | |
| 2006/0103355 A1 | 5/2006 | Patino et al. | |
| 2006/0145658 A1 | 7/2006 | Wang | |
| 2006/0190174 A1 | 8/2006 | Li et al. | |
| 2006/0244673 A1 | 11/2006 | Schantz et al. | |
| 2006/0266564 A1 | 11/2006 | Perlman et al. | |
| 2006/0267523 A1 | 11/2006 | Seelig et al. | |
| 2007/0042729 A1 | 2/2007 | Baaman et al. | |
| 2007/0052397 A1 | 3/2007 | Thompson et al. | |
| 2007/0076459 A1 | 4/2007 | Limpkin | |
| 2007/0115695 A1 | 5/2007 | Lou et al. | |
| 2007/0153560 A1 | 7/2007 | Zhang et al. | |
| 2007/0205881 A1 | 9/2007 | Breed | |
| 2007/0252441 A1 | 11/2007 | Yamauchi et al. | |
| 2007/0267918 A1 | 11/2007 | Gyland | |
| 2008/0062724 A1 | 3/2008 | Feng et al. | |
| 2008/0164761 A1 | 7/2008 | O'Bryant et al. | |
| 2008/0238364 A1 | 10/2008 | Weber | |
| 2008/0297107 A1 | 12/2008 | Kato et al. | |
| 2009/0007388 A1 | 1/2009 | Villeneuve | |
| 2009/0009410 A1 | 1/2009 | Dolgin et al. | |
| 2009/0010334 A1 | 1/2009 | Ueda et al. | |
| 2009/0071255 A1 | 3/2009 | Okuda et al. | |
| 2009/0079388 A1 | 3/2009 | Reddy | |
| 2009/0103341 A1 | 4/2009 | Lee et al. | |
| 2009/0108677 A1 | 4/2009 | Walter et al. | |
| 2009/0121675 A1 | 5/2009 | Ho et al. | |
| 2009/0207006 A1 | 8/2009 | Richter et al. | |
| 2009/0214051 A1 | 8/2009 | Lockett et al. | |
| 2009/0243397 A1 | 10/2009 | Cook et al. | |
| 2009/0251008 A1 | 10/2009 | Sugaya | |
| 2009/0251938 A1 | 10/2009 | Hallak | |
| 2010/0005889 A1 | 1/2010 | Knittel et al. | |
| 2010/0020579 A1 | 1/2010 | Melanson | |
| 2010/0102742 A1 | 4/2010 | Park et al. | |
| 2010/0106984 A1 | 4/2010 | Weng et al. | |
| 2010/0109604 A1 | 5/2010 | Boys et al. | |
| 2010/0110741 A1 | 5/2010 | Lin et al. | |
| 2010/0117596 A1 | 5/2010 | Cook et al. | |
| 2010/0134067 A1 | 6/2010 | Baxter et al. | |
| 2010/0141206 A1 | 6/2010 | Agassi et al. | |
| 2010/0148723 A1 | 6/2010 | Cook et al. | |
| 2010/0190435 A1 | 7/2010 | Cook et al. | |
| 2010/0198438 A1 | 8/2010 | Iraha et al. | |
| 2010/0201189 A1 | 8/2010 | Kirby et al. | |
| 2010/0201533 A1 | 8/2010 | Kirby et al. | |
| 2010/0230197 A1 | 9/2010 | Ortmann et al. | |
| 2010/0231163 A1 | 9/2010 | Mashinsky | |
| 2010/0231340 A1 | 9/2010 | Fiorello et al. | |
| 2010/0235006 A1 | 9/2010 | Brown | |
| 2010/0244775 A1 | 9/2010 | Smith | |
| 2010/0259447 A1 | 10/2010 | Crouch | |
| 2010/0259458 A1 | 10/2010 | Mattis et al. | |
| 2010/0295506 A1 | 11/2010 | Ichikawa | |
| 2011/0001485 A1 | 1/2011 | Feight et al. | |
| 2011/0009057 A1 | 1/2011 | Saunamaki et al. | |
| 2011/0013322 A1 | 1/2011 | Gale et al. | |
| 2011/0022222 A1 | 1/2011 | Tonegawa | |
| 2011/0050164 A1 | 3/2011 | Partovi et al. | |
| 2011/0065398 A1 | 3/2011 | Liu et al. | |
| 2011/0082621 A1 | 4/2011 | Berkobin et al. | |
| 2011/0084548 A1 | 4/2011 | Gale et al. | |
| 2011/0084654 A1 | 4/2011 | Julstrom et al. | |
| 2011/0089904 A1 | 4/2011 | Ward | |
| 2011/0095959 A1 | 4/2011 | Schertz et al. | |
| 2011/0133726 A1 | 6/2011 | Ballantyne et al. | |
| 2011/0156643 A1 | 6/2011 | Chen et al. | |
| 2011/0163717 A1 | 7/2011 | Gale et al. | |
| 2011/0169448 A1 | 7/2011 | Ichikawa | |
| 2011/0176343 A1 | 7/2011 | Kojima | |
| 2011/0181240 A1 | 7/2011 | Baarman et al. | |
| 2011/0181407 A1 | 7/2011 | Kole | |
| 2011/0187317 A1 | 8/2011 | Mitake et al. | |

(56) References Cited

U.S. PATENT DOCUMENTS

| | | |
|---|---|---|
| 2011/0204845 A1 | 8/2011 | Paparo et al. |
| 2011/0244817 A1 | 10/2011 | Low |
| 2011/0245987 A1 | 10/2011 | Pratt et al. |
| 2011/0249118 A1 | 10/2011 | Bruno |
| 2011/0254377 A1 | 10/2011 | Widmer et al. |
| 2011/0254503 A1 | 10/2011 | Widmer et al. |
| 2011/0279244 A1 | 11/2011 | Park et al. |
| 2011/0285210 A1 | 11/2011 | Lemmens et al. |
| 2011/0302078 A1 | 12/2011 | Failing |
| 2012/0007437 A1 | 1/2012 | Fells et al. |
| 2012/0043172 A1 | 2/2012 | Ichikawa |
| 2012/0043807 A1 | 2/2012 | Ichikawa |
| 2012/0091970 A1 | 4/2012 | Cho et al. |
| 2012/0106206 A1 | 5/2012 | Tang et al. |
| 2012/0153717 A1 | 6/2012 | Obayashi et al. |
| 2012/0306439 A1 | 12/2012 | Ichikawa et al. |
| 2013/0076155 A1 | 3/2013 | Yu et al. |
| 2017/0267110 A1 | 9/2017 | Widmer et al. |
| 2018/0040416 A1 | 2/2018 | Lestoquoy et al. |
| 2019/0275901 A1 | 9/2019 | Widmer et al. |
| 2020/0094696 A1 | 3/2020 | Widmer et al. |
| 2020/0298714 A1 | 9/2020 | Widmer et al. |
| 2022/0144106 A1 | 5/2022 | Widmer et al. |
| 2022/0363146 A1 | 11/2022 | Widmer et al. |

FOREIGN PATENT DOCUMENTS

| | | |
|---|---|---|
| EP | 0751580 | 1/1997 |
| EP | 2066013 | 6/2009 |
| EP | 2431214 | 3/2012 |
| GB | 2463548 | 3/2010 |
| JP | H0454804 | 2/1992 |
| JP | H0764637 | 3/1995 |
| JP | H08103039 | 4/1996 |
| JP | H09200115 | 7/1997 |
| JP | H09215211 | 8/1997 |
| JP | H1014124 | 1/1998 |
| JP | H10136588 | 5/1998 |
| JP | H11252810 | 9/1999 |
| JP | 2001008380 | 1/2001 |
| JP | 2002084673 | 3/2002 |
| JP | 2002281754 | 9/2002 |
| JP | 2003315449 | 11/2003 |
| JP | 2003533961 | 11/2003 |
| JP | 2006003116 | 1/2006 |
| JP | 2006517378 | 7/2006 |
| JP | 3840765 B2 | 11/2006 |
| JP | 2009110893 | 5/2009 |
| JP | 2009136104 | 6/2009 |
| JP | 2009251895 | 10/2009 |
| JP | 2009261105 | 11/2009 |
| JP | 2009539343 | 11/2009 |
| JP | 2010022183 | 1/2010 |
| JP | 2010073976 | 4/2010 |
| JP | 2010081736 | 4/2010 |
| JP | 2011504720 | 2/2011 |
| JP | 2011182633 | 9/2011 |
| JP | 2012161193 | 8/2012 |
| KR | 20100026075 | 3/2010 |
| TW | 200929817 | 7/2009 |
| WO | WO 1995/01669 | 1/1995 |
| WO | WO 1995/01699 | 1/1995 |
| WO | WO 2001/089058 | 11/2001 |
| WO | WO 2004047262 | 6/2004 |
| WO | WO 2004/068726 | 8/2004 |
| WO | WO 2004107276 | 12/2004 |
| WO | WO 2007/139401 | 12/2007 |
| WO | WO 2008145982 | 12/2008 |
| WO | WO 2009/027674 | 3/2009 |
| WO | WO 2009/069039 | 6/2009 |
| WO | WO 2009/111597 | 9/2009 |
| WO | WO 2010/006078 | 1/2010 |
| WO | WO 2010/027559 | 3/2010 |
| WO | WO 2010/028092 | 3/2010 |
| WO | WO 2010/033727 | 3/2010 |
| WO | WO 2010/035338 | 4/2010 |

OTHER PUBLICATIONS

Murayama T., et al., "Method of Designing an Impedance Matching Network for Wireless Power Transfer Systems," IEEE 42nd Annual Conference of Industrial Electronics Society, Oct. 23-26, 2016, pp. 4504-4509.

Suzuki M., et al., "Design Method for Low Radiated Emission of 85 kHz Band 44 kW Rapid Charger for Electric Bus," IEEE Applied Power Electronics Conference and Exposition, Mar. 26-30, 2017, pp. 3695-3701.

Teck Chuan Beh et al., "Basic Study of Improving Efficiency of Wireless Power Transfer via Magnetic Resonance Coupling Based on Impedance Matching", Industrial Electronics (ISIE), 2010 IEEE International Symposium on, Jul. 2010, pp. 2011-2016.

European Search Report—EP15150222—Search Authority—Munich—May 27, 2015.

International Search Report and Written Opinion—PCT/US2011/031856—ISA/EPO—Dec. 21, 2011.

International Search Report and Written Opinion—PCT/US2011/031850—ISA/EPO—May 15, 2012.

* cited by examiner

WIRELESS POWER ANTENNA ALIGNMENT ADJUSTMENT SYSTEM FOR VEHICLES

CROSS-REFERENCE TO RELATED APPLICATIONS

This application is a continuation of U.S. patent application Ser. No. 17/582,651, filed Jan. 24, 2022, which is a continuation of U.S. patent application Ser. No. 16/897,644, filed Jun. 10, 2020, which is a continuation of U.S. patent application Ser. No. 16/427,139, filed May 30, 2019, which is a divisional application of U.S. patent application Ser. No. 13/082,229, filed Apr. 7, 2011 (now U.S. Pat. No. 10,343,535, issued Jul. 9, 2019), which claims the benefit of: U.S. Provisional Patent Application No. 61/322,196, filed on Apr. 8, 2010, U.S. Provisional Patent Application No. 61/322,214, filed on Apr. 8, 2010, and U.S. Provisional Patent Application No. 61/322,221, filed on Apr. 8, 2010, the disclosures of which are hereby incorporated by reference in their entireties.

BACKGROUND

Field

The present invention relates generally to wireless power transfer, and more specifically to devices, systems, and methods related to wireless power transfer to vehicles including batteries.

Background

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

Recently, vehicles have been introduced that include locomotion power from electricity and batteries to provide that electricity. Hybrid electric vehicles include on-board chargers that use power from vehicle braking and traditional motors to charge the vehicles. Vehicles that are solely electric must receive the electricity for charging the batteries from other sources. These electric vehicles are conventionally proposed to be charged through some type of wired alternating current (AC) such as household or commercial AC supply sources.

Efficiency is of importance in a wireless power transfer system due to the losses occurring in the course of wireless transmission of power. Since wireless power transmission is often less efficient than wired transfer, efficiency is of an even greater concern in a wireless power transfer environment. As a result, there is a need for methods and apparatuses that provide wireless power to electric vehicles.

A wireless charging system for electric vehicles may require transmit and receive antennas to be aligned within a certain degree. Adequate alignment of transmit and receive antennas within an electric vehicle wireless charging system may require proper positioning of an electric vehicle within a parking space, as well as fine tuning of antenna locations after the electric vehicle has been positioned within the parking space. There is a need for systems, devices, and methods related to an electric vehicle guidance system. Moreover, a need exists for devices, systems, and methods for fine alignment of antennas within an electric vehicle wireless charging system.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors.

Moreover, the term "wireless charging" is used herein to mean providing wireless power to one or more electrochemical cells or systems including electrochemical cells for the purpose of recharging the electrochemical cells.

The term "battery electric vehicle" (BEV) is used herein to mean a vehicle that includes, as part of its locomotion abilities, electrical power derived from one or more rechargeable electrochemical cells. As non-limiting examples, some BEVs may be hybrid electric vehicles that include on-board chargers that use power from vehicle deceleration and traditional motors to charge the vehicles, other BEVs may draw all locomotion ability from electrical power.

Exemplary embodiments of the invention include methods and apparatuses that provide wireless power to electric vehicles.

Figure 1:
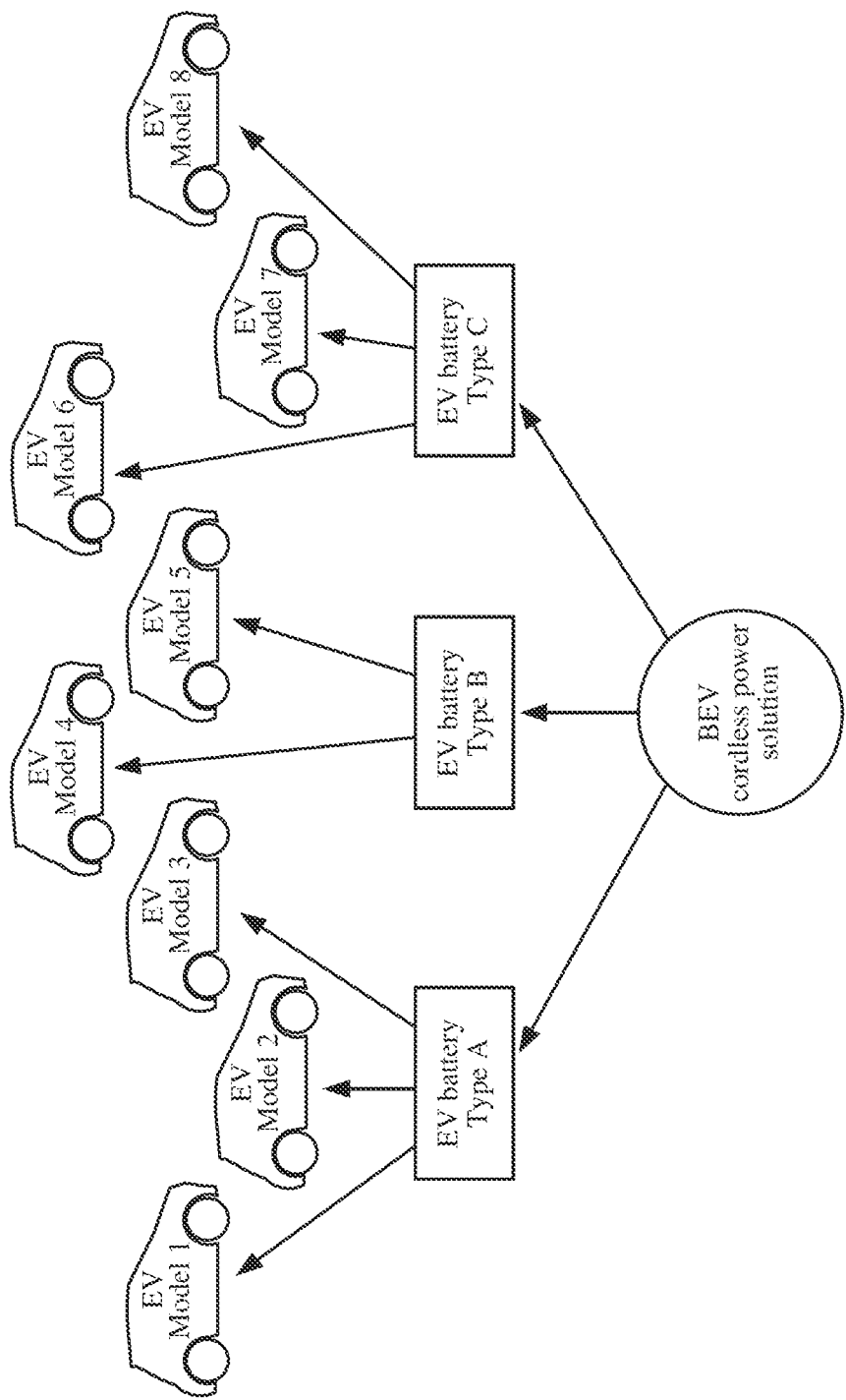
FIG. 1 is a hierarchical diagram illustrating how a wireless charging system can be used with a variety of replaceable batteries, each of which may be used in a variety of battery electric vehicles (BEV).

FIG. 1 is a hierarchical diagram illustrating how a wireless charging system can be used with a variety of replaceable batteries, each of which may be used in a variety of battery electric vehicles. Starting at the top, there may be many different models of BEVs. However, groups of vehicle models may be adapted to use only a limited number of replaceable battery units, such as Electric Vehicle (EV) battery type A, EV battery type B, and EV battery type C. As non-limiting examples, these different battery types may be configured based on needed capacity of the batteries, space required for the batteries, form factor for the batteries, size of wireless power antennas, and form factor for wireless power antennas. With the battery types limited, particularly, the size, placement, and form factor of the wireless antennas, a single wireless power delivery solution can be provided that will provide near-field wireless coupling to the various battery types.

A battery integrated solution may ease adoption of wireless charging by EV manufacturers as this solution will have only minor impact on the electrical and mechanical design of an EV. Once widely accepted and standardized, only a relatively small number of EV battery types will need to be in circulation. Limiting the battery types will simplify customization of a wireless BEV charging solution as the number of battery types will be much smaller than the number of EV models that will be introduced into the market in the future.

Furthermore, limited battery types may enable an existing EV model to be retrofitted for wireless charging. This retrofitting could be simply performed by replacing a conventional battery in an EV with a new battery that integrates wireless charging and that behaves as the original battery at all its other interfaces. In addition, wireless power battery types may be configured with a wireless and contactless charging interface to the rest of the vehicles allowing for easy battery swapping and non-contact recharging of batteries, which may include some advantages in regards to reliability, mechanical wear out and safety.

Figure 2:
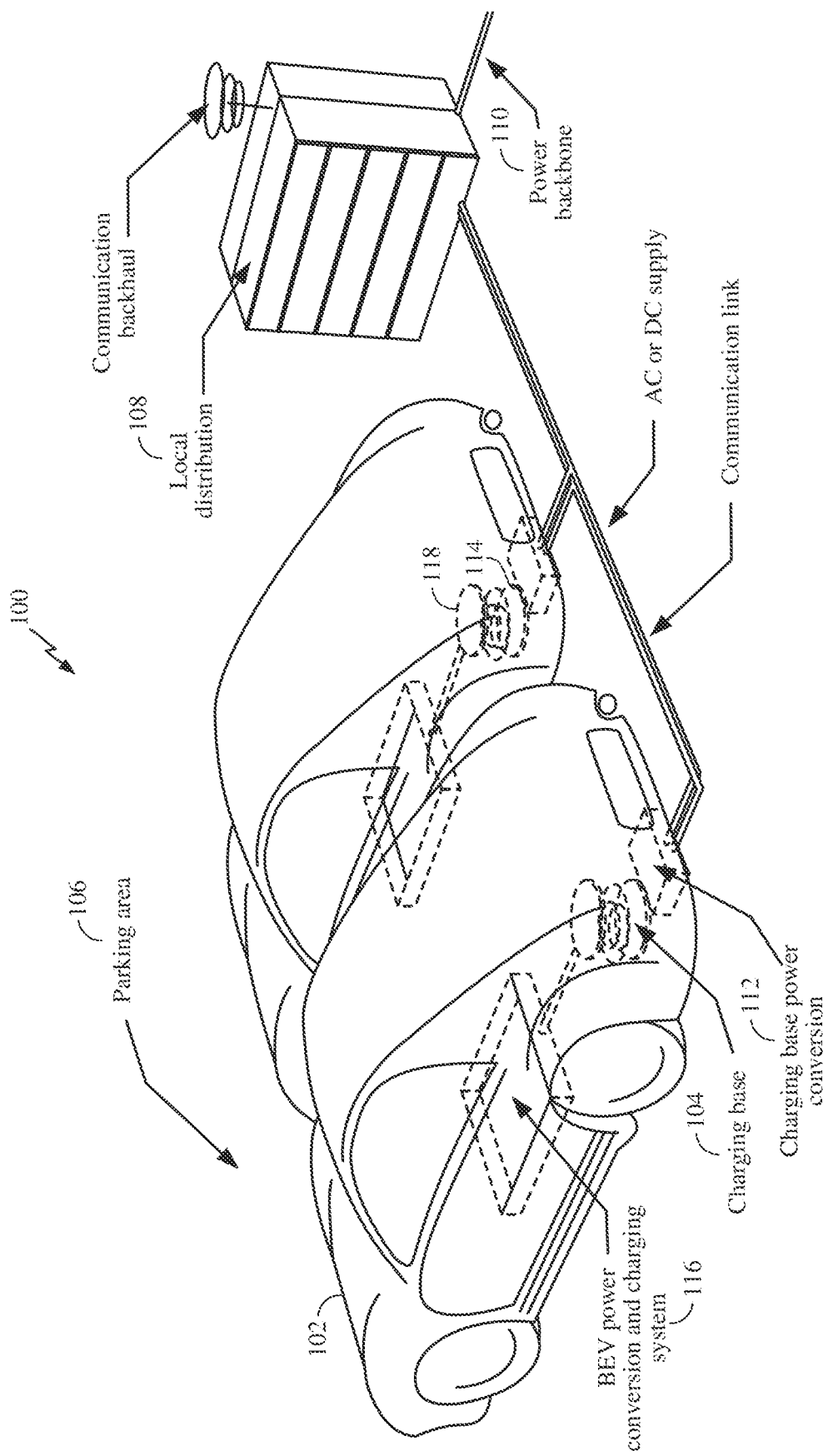
FIG. 2 illustrates a wireless charging system for BEVs equipped with a wireless receiver while the BEV is parked near a wireless transmitter.

FIG. 2 illustrates a wireless charging system for wireless charging enabled BEVs 102 while the BEV is parked near a wireless charging base (CB) 104. Two vehicles 102 are illustrated in a parking area 106 and parked over corresponding CBs 104. A local distribution center 108 is connected to a power backbone and is configured to provide an Alternating Current (AC) or a Direct Current (DC) supply to power conversion systems 112 as part of the CBs 104. The CBs 104 also include wireless power antennas 114 for generating or picking-up a near-field radiation. Each vehicle includes batteries, a BEV power conversion and charging system 116 and a wireless power antenna 118 interacting with the CB antenna 114 via the near-field. In some exemplary embodiments the BEV antenna 118 may be aligned with the CB antenna 114 and, therefore, disposed within the near-field region simply by the driver positioning the vehicle correctly relative to the CB antenna 114. In other exemplary embodiments, the driver may be given visual feedback, auditory feedback, or combinations thereof to determine when the vehicle is properly placed for wireless power transfer. In yet other exemplary embodiments, the vehicle may be positioned by an autopilot system, which may move the vehicle back and forth (e.g., in zig-zag movements) until an alignment error has reached a tolerable value. This may be performed automatically and autonomously by the vehicle without or with only minimal driver intervention provided that the vehicle is equipped with a servo steering wheel, ultrasonic sensors all around and artificial intelligence. In still other exemplary embodiments, the BEV antenna 118, the CB antenna 114, or a combination thereof may include means for displacing and moving the antennas relative to each other to more accurately orient them and develop a more optimum near-field coupling therebetween.

The CBs 104 may be located in a variety of locations. As non-limiting examples, some suitable locations are a parking area at a home of the vehicle owner, parking areas reserved for BEV wireless charging modeled after conventional petroleum-based filling stations, and parking lots at other locations such as shopping centers and places of employment.

These BEV charging stations may provide numerous benefits, such as, for example:
Convenience: charging can be performed automatically virtually without driver intervention and manipulations.
Reliability: there may be no exposed electrical contacts and no mechanical wear out.
Safety: manipulations with cables and connectors may not be needed, and there may be no cables, plugs, or sockets that may be exposed to moisture and water in an outdoor environment.
Vandalism resistant: There may be no sockets, cables, and plugs visible nor accessible.
Availability: if BEVs will be used as distributed storage devices to stabilize the grid. Availability can be increased with a convenient docking-to-grid solution enabling Vehicle to Grid (V2G) capability.
Esthetical and non-impedimental: There may be no column loads and cables that may be impedimental for vehicles and/or pedestrians.

As a further explanation of the V2G capability, the wireless power transmit and receive capabilities can be configured as reciprocal such that the CB 104 transfers power to the BEV 102 and the BEV transfers power to the CB 104. This capability may be useful for power distribution stability by allowing BEVs to contribute power to the overall distribution system in a similar fashion to how solar-cell power systems may be connected to the power grid and supply excess power to the power grid.

Figure 3:
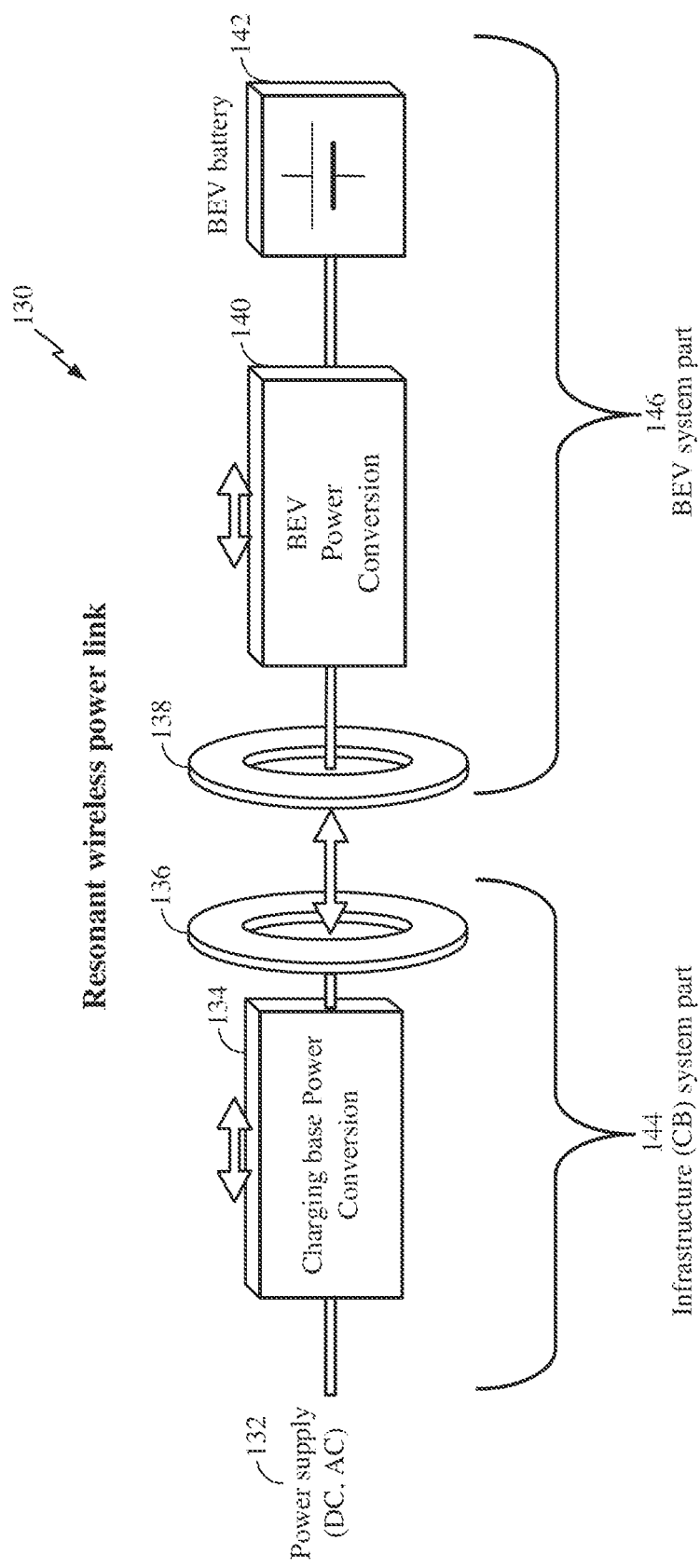
FIG. 3 is a simplified block diagram of a wireless power charging system for a BEV.

FIG. 3 is a simplified block diagram of a wireless power charging system for a BEV. Exemplary embodiments described herein use capacitively loaded wire loops (i.e., multi-turn coils) forming a resonant structure that is capable to efficiently couple energy from a primary structure (transmitter) to a secondary structure (receiver) via the magnetic near field if both primary and secondary are tuned to a common resonance frequency. The method is also known as "magnetic coupled resonance" and "resonant induction."

To enable wireless high power transfer, some exemplary embodiments may use a frequency in the range from 20-60 kHz. This low frequency coupling may allow highly efficient power conversion that can be achieved using state-of-the-art solid state devices. In addition, there may be less coexistence issues with radio systems compared to other bands.

In FIG. 3, a conventional power supply 132, which may be AC or DC, supplies power to the CB power conversion module 134 assuming energy transfer towards vehicle. The CB power conversion module 134 drives the CB antenna 136 to emit a desired frequency signal. If the CB antenna 136 and BEV antenna 138 are tuned to substantially the same frequencies and are close enough to be within the near-field radiation from the transmit antenna, the CB antenna 136 and BEV antenna 138 couple such that power may be transferred to the BEV antenna 138 and extracted in the BEV power conversion module 140. The BEV power conversion module 140 may then charge the BEV batteries 142. The power supply 132, CB power conversion module 134, and CB antenna 136 make up the infrastructure part 144 of an overall wireless power system 130, which may be stationary and located at a variety of locations as discussed above. The BEV battery 142, BEV power conversion module 140, and BEV antenna 138 make up a wireless power subsystem 146 that is part of the vehicle or part of the battery pack.

In operation, assuming energy transfer towards the vehicle or battery, input power is provided from the power supply 132 such that the CB antenna 136 generates a radiated field for providing the energy transfer. The BEV antenna 138 couples to the radiated field and generates output power for storing or consumption by the vehicle. In exemplary embodiments, the CB antenna 136 and BEV antenna 138 are configured according to a mutual resonant relationship and when the resonant frequency of the BEV antenna 138 and the resonant frequency of the CB antenna 136 are very close, transmission losses between the CB and BEV wireless power subsystems are minimal when the BEV antenna 138 is located in the "near-field" of the CB antenna 136.

As stated, an efficient energy transfer occurs by coupling a large portion of the energy in the near-field of a transmitting antenna to a receiving antenna rather than propagating most of the energy in an electromagnetic wave to the far field. When in this near-field a coupling mode may be developed between the transmit antenna and the receive antenna. The area around the antennas where this near-field coupling may occur is referred to herein as a near field coupling-mode region.

The CB and the BEV power conversion module may both include an oscillator, a power amplifier, a filter, and a matching circuit for efficient coupling with the wireless power antenna. The oscillator is configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module to the wireless power antenna.

The CB and BEV power conversion module may also include, a rectifier, and switching circuitry to generate a suitable power output to charge the battery.

BEV and CB antennas used in exemplary embodiments may be configured as "loop" antennas, and more specifically, multi-turn loop antennas, which may also be referred to herein as a "magnetic" antenna. Loop (e.g., multi-turn loop) antennas may be configured to include an air core or a physical core such as a ferrite core. An air core loop antenna may allow the placement of other components within the core area. Physical core antennas may allow development of a stronger electromagnetic field.

As stated, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, a capacitor may be added in series with the antenna to create a resonant circuit that generates a magnetic field. Accordingly, for larger diameter loop antennas, the size of capacitance needed to induce resonance decreases as the diameter or inductance of the loop increases. It is further noted that inductance may also depend on a number of turns of a loop antenna. Furthermore, as the diameter of the loop antenna increases, the efficient energy transfer area of the near-field increases. Of course, other resonant circuits are possible. As another non-limiting example, a capacitor may be placed in parallel between the two terminals of the loop antenna (i.e., parallel resonant circuit).

Exemplary embodiments of the invention include coupling power between two antennas that are in the near-fields of each other. As stated, the near-field is an area around the antenna in which electromagnetic fields (also referred to herein as near field radiation) exist but may not propagate or radiate away from the antenna. Near-field coupling-mode regions are typically confined to a volume that is near the physical volume of the antenna e.g. within a radius of one sixth of the wavelength. In the exemplary embodiments of the invention, magnetic type antennas such as single and multi-turn loop antennas are used for both transmitting and receiving since magnetic near-field amplitudes in practical embodiments tend to be higher for magnetic type antennas in comparison to the electric near-fields of an electric-type antenna (e.g., a small dipole). This allows for potentially higher coupling between the pair. Another reason for relying on a substantially magnetic field is its low interaction with non-conductive dielectric materials in the environment and the safety issue. Electric antennas for wireless high power transmission may involve extremely high voltages. Furthermore, "electric" antennas (e.g., dipoles and monopoles) or a combination of magnetic and electric antennas is also contemplated.

Figure 4:
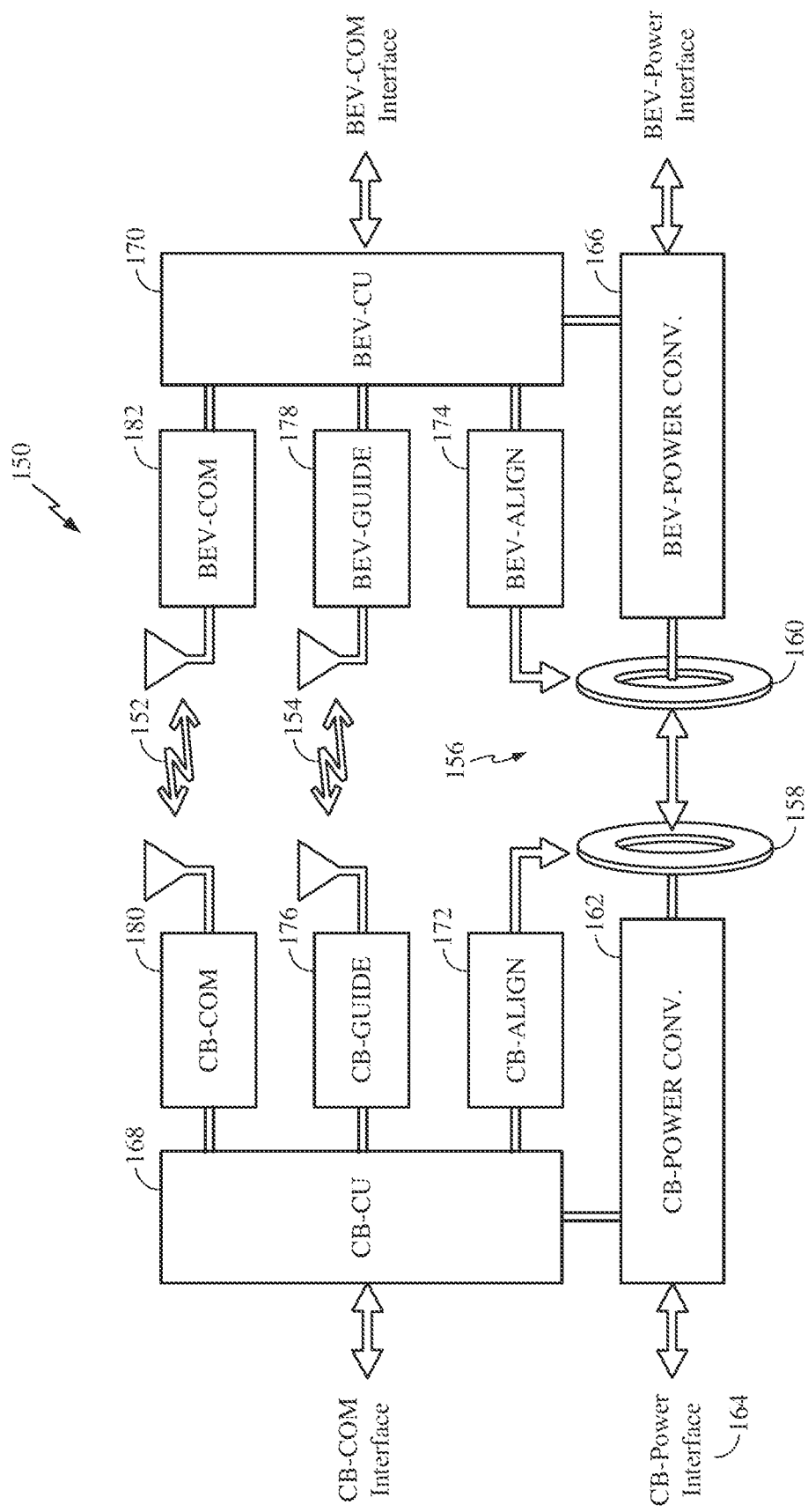
FIG. 4 is a more detailed block diagram of a wireless power charging system for a BEV illustrating communication links, guidance links, and alignment systems for the transmit antenna and receive antenna.

FIG. 4 is a more detailed block diagram of a generic wireless power charging system 150 for a BEV illustrating communication links 152, guidance links 154, and alignment systems 156 for the CB antenna 158 and BEV antenna 160. As with the exemplary embodiment of FIG. 3 and assuming energy flow towards BEV, in FIG. 4 the CB power conversion unit 162 receives AC or DC power from the CB power interface 164 and excites the CB antenna 158 at or near its resonant frequency. The BEV antenna 160, when in the near field coupling-mode region, receives energy from the near field coupling mode region to oscillate at or near the resonant frequency. The BEV power conversion unit 166 converts the oscillating signal from the receive antenna 160 to a power signal suitable for charging the battery.

The generic system may also include a CB communication unit 168 and a BEV communication unit 170, respectively. The CB communication unit 168 may include a communication interface to other systems (not shown) such as, for example, a computer, and a power distribution center. The BEV communication unit 170 may include a communication interface to other systems (not shown) such as, for example, an on-board computer on the vehicle, other battery charging controller, other electronic systems within the vehicles, and remote electronic systems.

The CB and BEV communication units may include subsystems or functions for specific application with separate communication channels therefore. These communications channels may be separate physical channels or just separate logical channels. As non-limiting examples, a CB alignment unit 172 may communicate with a BEV alignment unit 174 to provide a feedback mechanism for more closely aligning the CB antenna 158 and BEV antenna 160, either autonomously or with operator assistance. Similarly, a CB guide unit 176 may communicate with a BEV guide unit 178 to provide a feedback mechanism to guide an operator in aligning the CB antenna 158 and BEV antenna 160. In addition, there may be a separate general-purpose communication channel 152 including CB communication unit 180 and BEV communication unit 182 for communicating other information between the CB and the BEV. This information may include information about EV characteristics, battery characteristics, charging status, and power capabilities of both the CB and the BEV, as well as maintenance and diagnostic data. These communication channels may be separate physical communication channels such as, for example, Bluetooth, zigbee, cellular, etc.

In addition, some communication may be performed via the wireless power link without using specific communications antennas. In other words the communications antenna and the wireless power antenna are the same. Thus, some exemplary embodiments of the CB may include a controller (not shown) for enabling keying type protocol on the wireless power path. By keying the transmit power level (Amplitude Shift Keying) at predefined intervals with a predefined protocol, the receiver can detect a serial communication from the transmitter. The CB power conversion module 162 may include a load sensing circuit (not shown) for detecting the presence or absence of active BEV receivers in the vicinity of the near-field generated by the CB antenna 158. By way of example, a load sensing circuit monitors the current flowing to the power amplifier, which is affected by the presence or absence of active receivers in the vicinity of the near-field generated by CB antenna 158. Detection of changes to the loading on the power amplifier may be monitored by the controller for use in determining whether to enable the oscillator for transmitting energy, to communicate with an active receiver, or a combination thereof.

BEV circuitry may include switching circuitry (not shown) for connecting and disconnecting the BEV antenna 160 to the BEV power conversion unit 166. Disconnecting the BEV antenna not only suspends charging, but also changes the "load" as "seen" by the CB transmitter, which can be used to "cloak" the BEV receiver from the transmitter. If the CB transmitter includes the load sensing circuit, it can detect these load changes. Accordingly, the CB has a mechanism for determining when BEV receivers are present in the CB antenna's near-field.

Figure 5:
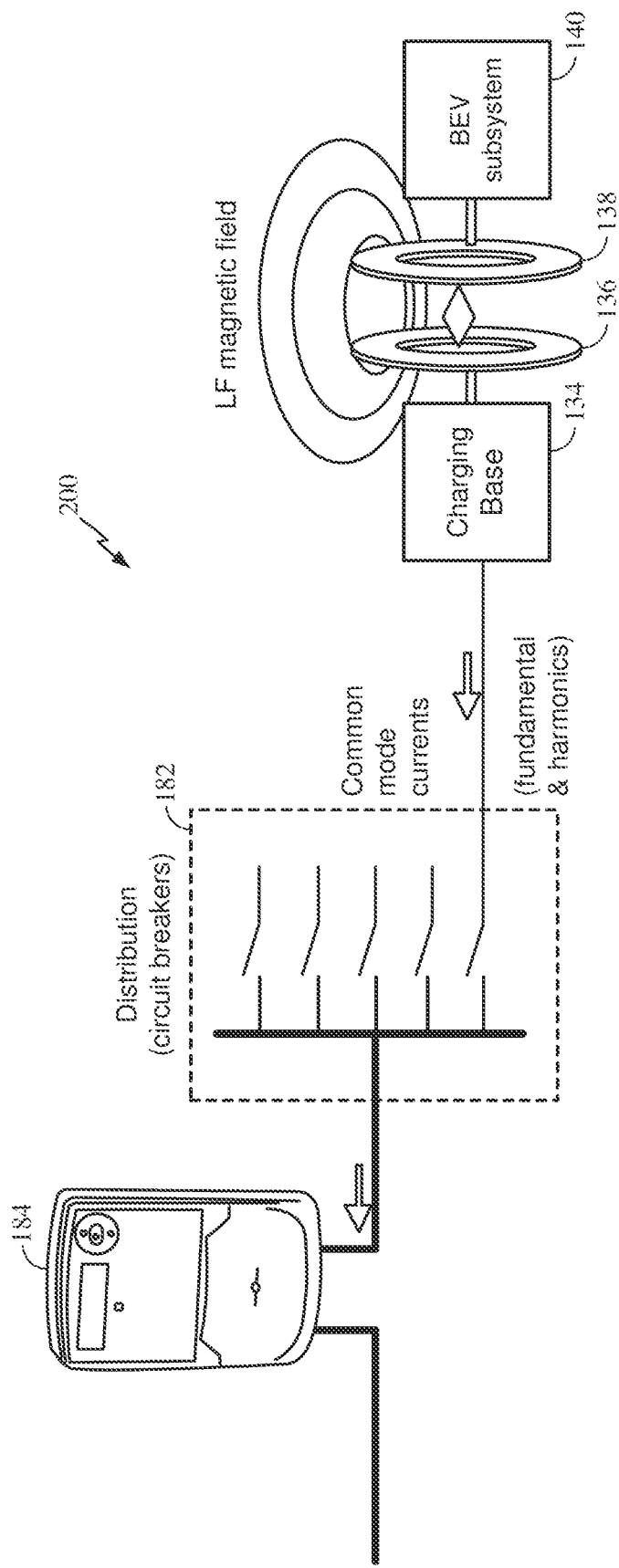
FIG. 5 illustrates portions of a distribution system for low voltage power line communications that may be used in some embodiments of the invention.

FIG. 5 illustrates portions of a power distribution system 200 enabled for low voltage power line communications that may be used in some embodiments of the invention. The CB may be linked to a power line communication system through a power distribution 182 to provide Power Line Communications (PLC) via its external CB-COM interface that supports the relevant PLC standard. The PLC node communicating with the external CB-COM interface may be integrated in an electricity (energy) meter 184. In many countries and particularly in Europe, PLC may play an important role as part of an Automated Metering Infrastructure (AMI) and for Smart Grid applications. An AMI may include elements such as: Automatic Meter Reading (AMR) of electricity, gas, water, heat; energy and water use profiling; demand forecasting; and demand side management. Furthermore, with exemplary embodiments of the invention, AMI may include management of V2G for BEVs. As a non-limiting example, an in-house PLC system may be configured as part of a home area network for home automation applications. Some non-limiting frequencies for PLC nodes may be in Band B (95-125 kHz) or Band C (125-140 kHz).

Wireless power charging in BEVs may be adapted to many different battery capabilities and technologies. For some exemplary embodiments, information about the battery capabilities and technologies may be useful in determining charging characteristics and charging profiles. Some non-limiting examples of battery capabilities are; battery charge, battery energy, battery voltage, battery capacity, battery charge current, battery charge power, and charging capabilities.

Many different batteries and electrochemical cell technologies may be used in BEVs. Some non-limiting examples of suitable electrochemical cells are, Lithium Ion, Lithium polymer, and lead-acid type batteries. Li-Ion cells may provide high energy density due to a high battery pack voltage (e.g., 400 V). Lead acid cells may provide high energy density due to high battery capacity (e.g. 180 Ah). Currently, there has been a trend to Li-Ion cells because they provide a high energy-density and high power-density. However, exemplary embodiments of the present invention may be used in other rechargeable electrochemical or electromechanical (e.g. flywheel) cells and even future rechargeable electrochemical or electromechanical cells.

Figure 6:
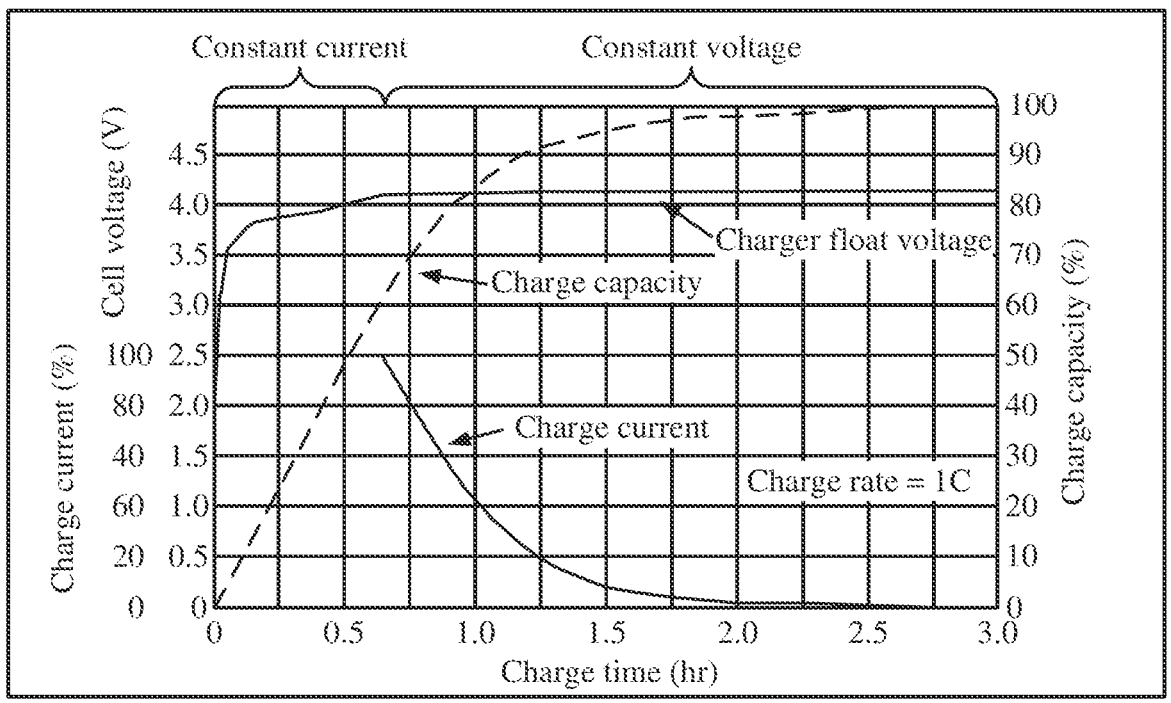
FIG. 6 shows a typical charging process of a Li-Ion battery which may be representative for charging a battery that may be used in a BEV.

FIG. 6 illustrates a typical charging process of a Li-Ion battery that may be representative for a battery that may be used in a BEV. The graph illustrates charge current versus charge time, cell voltage, and charge capacity. During a first phase, substantially constant current may be applied to the battery as the charge capacity is increasing at a relatively high rate. During a second phase, a substantially constant voltage may be applied as the charge capacity nears full charge. FIG. 6 illustrates an example charge scenario for charging a battery at its rated capacity (often referred to as 1C). Other fast charge scenarios may be used, such as rates faster than 1C (e.g., 2C, 3C, etc).

Figure 7:
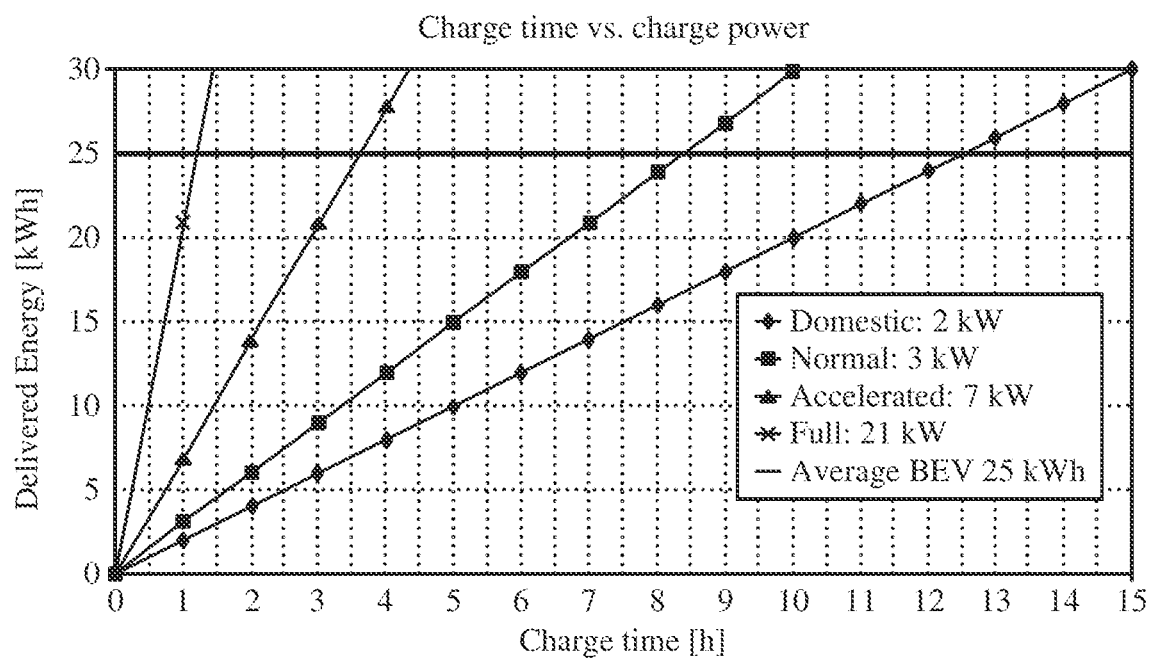
FIG. 7 illustrates examples of charging times for a battery that may be used in a BEV.

FIG. 7 illustrates examples of charging times for a battery that may be used in a BEV. A stored energy of 25 kWh is shown as one example of a charge capacity for a typical battery in a BEV. Depending on the power available, the charge time to full capacity may be as low as about 1.25 hours with a high delivery capability of about 21 kW, about 3.5 hours for an accelerated delivery capability of about 7 kW, about 8.5 hours for a normal delivery capability of about 3 kW, and about 12.5 hours for a domestic delivery capability of about 2 kW. FIG. 7 is intended as an example only to show ranges of charging times and how they may be adapted to wireless power delivery capabilities.

Figure 8:
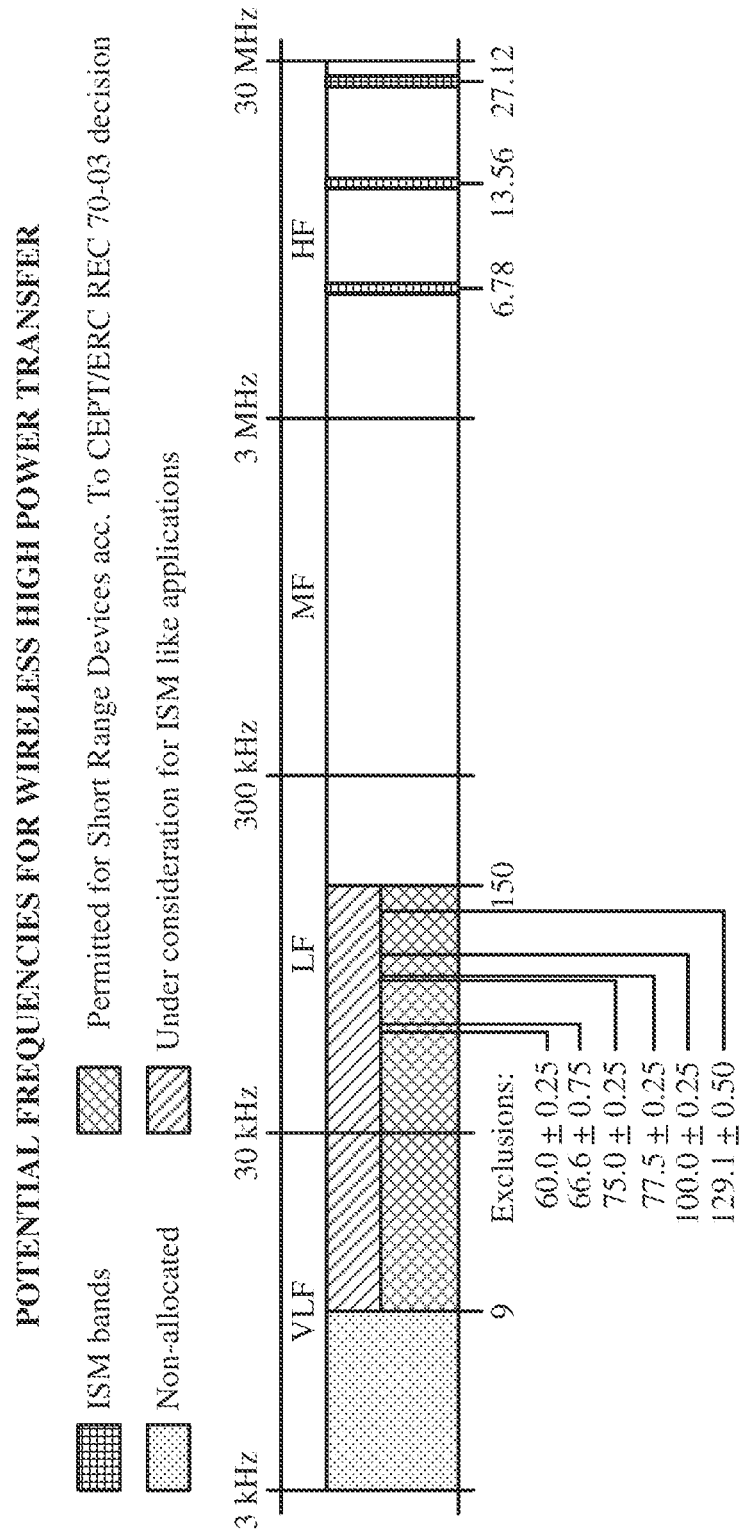
FIG. 8 illustrates a frequency spectrum showing various frequencies that may be available for wireless charging of BEVs.

FIG. 8 illustrates a frequency spectrum showing various frequencies that may be available and suitable for wireless charging of BEVs. Some potential frequency ranges for wireless high power transfer to BEVs include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 9:
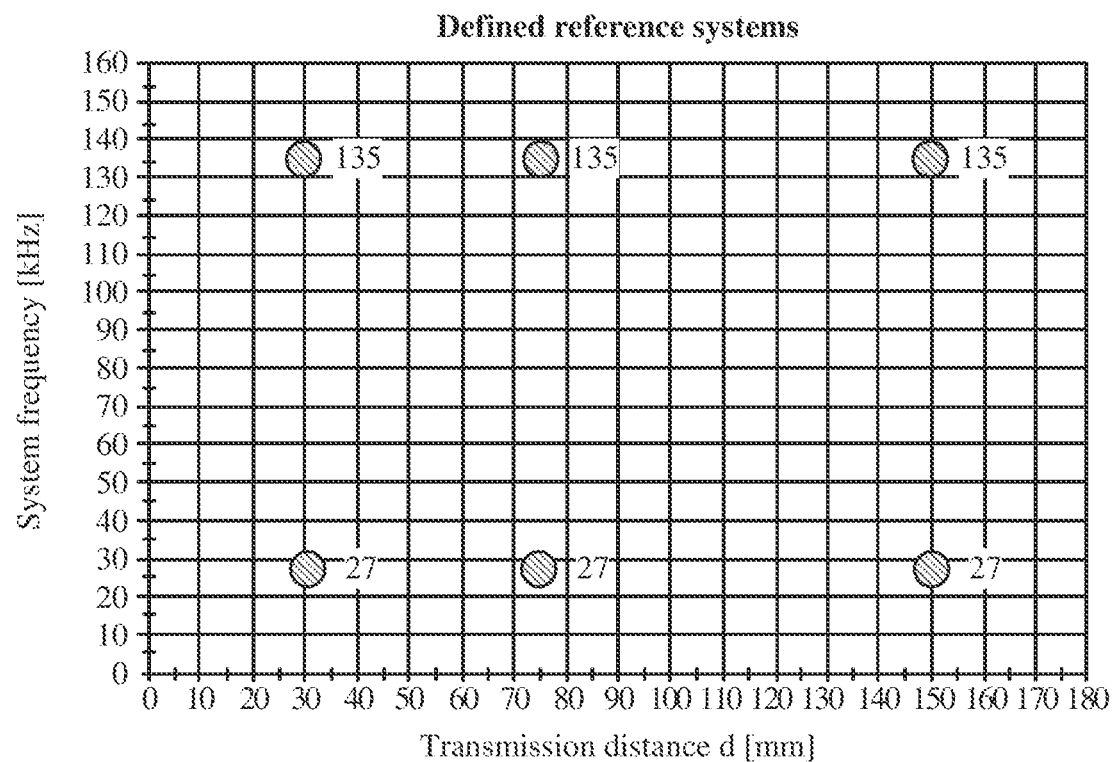
FIG. 9 illustrates some possible frequencies and transmission distances that may be useful in wireless charging of BEVs.

FIG. 9 illustrates some possible frequencies and transmission distances that may be useful in wireless charging of BEVs. Some example transmission distances that may be useful for BEV wireless charging are about 30 mm, about 75 mm, and about 150 mm. Some exemplary frequencies may be about 27 kHz in the VLF band and about 135 kHz in the LF band.

Many consideration must be taken into account on determining a suitable frequency beyond just the resonance characteristics and coupling-mode region of the receive and transmit antennas. Wireless power frequencies may interfere with frequencies used for other applications. As non-limiting examples, there may be VLF/LF coexistence issues with power line frequencies, audible frequencies and communication frequencies. Some non-limiting examples where coexistence may be an issue for VLF and LF are: frequencies for radio clocks, frequencies for LW AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems and acoustic emission perceivable by humans and animals.

Some non-limiting examples where coexistence may be an issue for HF frequencies are industrial, scientific and medical (ISM) radio bands, such as: 6.78 MHz for remote control applications and RFID in FDX or HDX mode with continuous energy transfer; 13.56 MHz for RFID in FDX or HDX mode with continuous energy transfer as well as portable device wireless power; and 27.12 MHz for Railway applications (Eurobalise 27.095 MHz), Citizen band radio, and remote control (e.g., models, toys, garage door, computer mouse, etc.).

Figure 10:
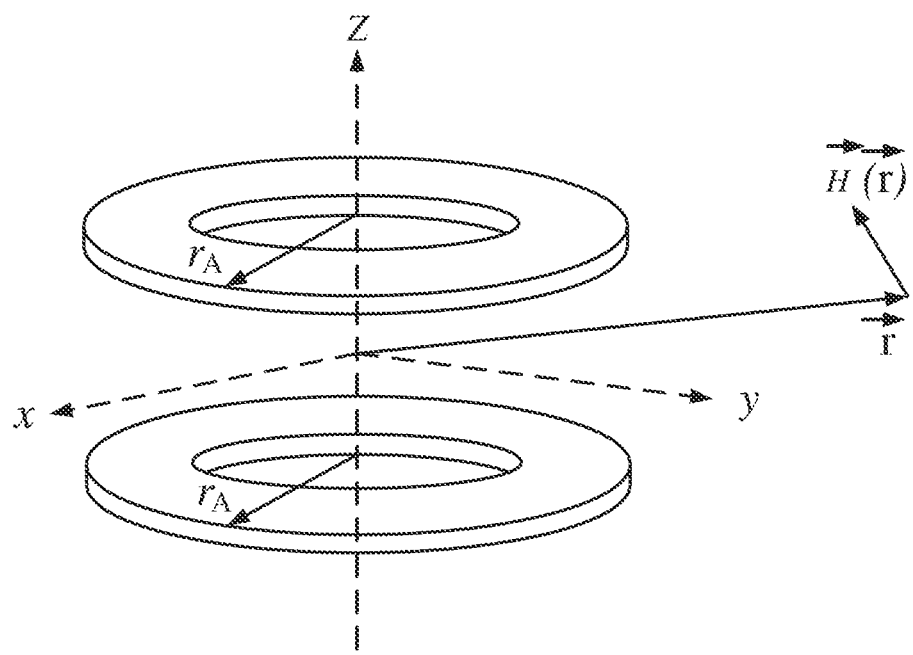
FIG. 10 illustrates transmit and receive loop antennas showing magnetic field strength relative to radius of the antennas.

FIG. 10 illustrates transmit and receive loop antennas showing field strength relative to radius of the antennas. Antenna structures with a radius larger or smaller than an optimum radius generate higher field strength in the vicinity of the antenna for a given transferred power. H-field strength increases linearly with increasing power transfer distance and for a given transferred power provided that the antenna radius is proportionally increased thus always optimum.

Figure 11A:
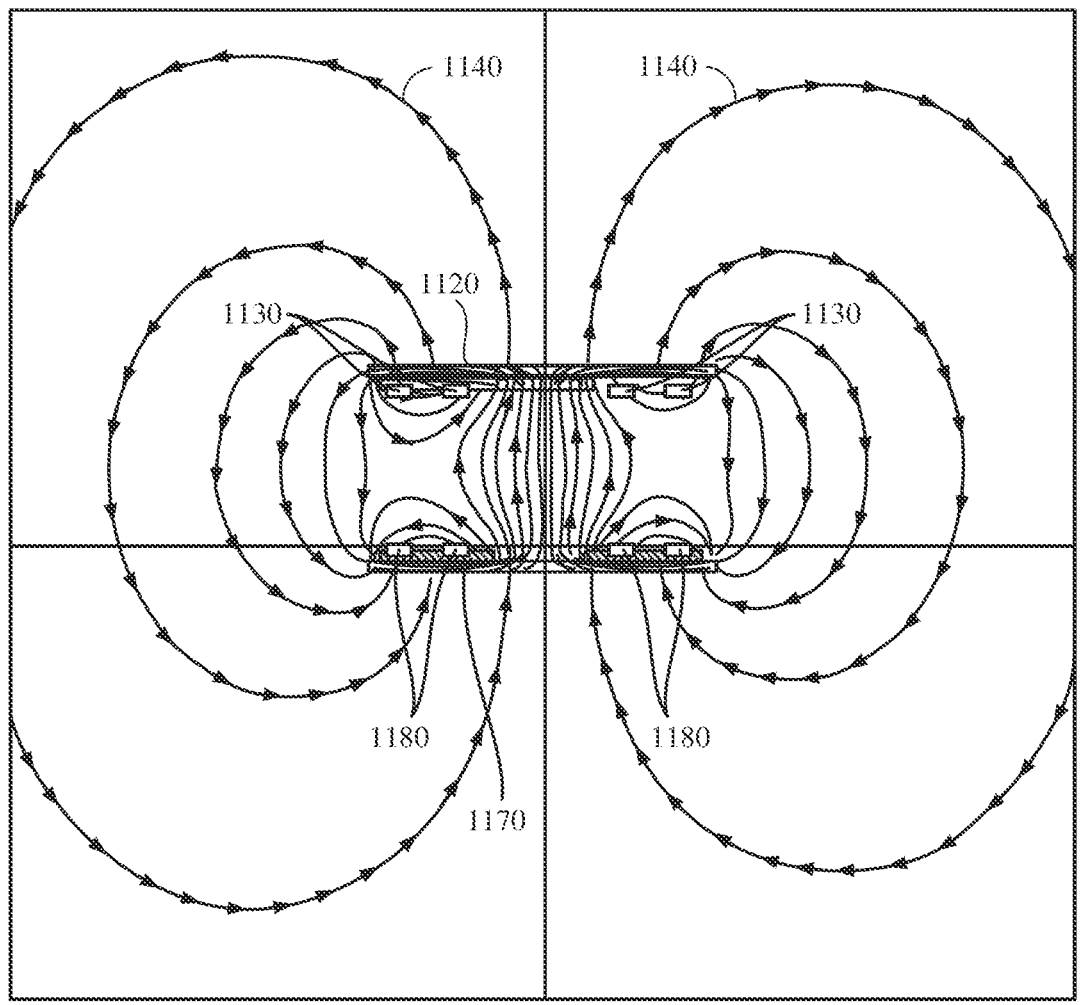
FIGS. 11A and 11B illustrate magnetic fields around a loop antenna and accompanying ferrite backing.
Figure 11B:
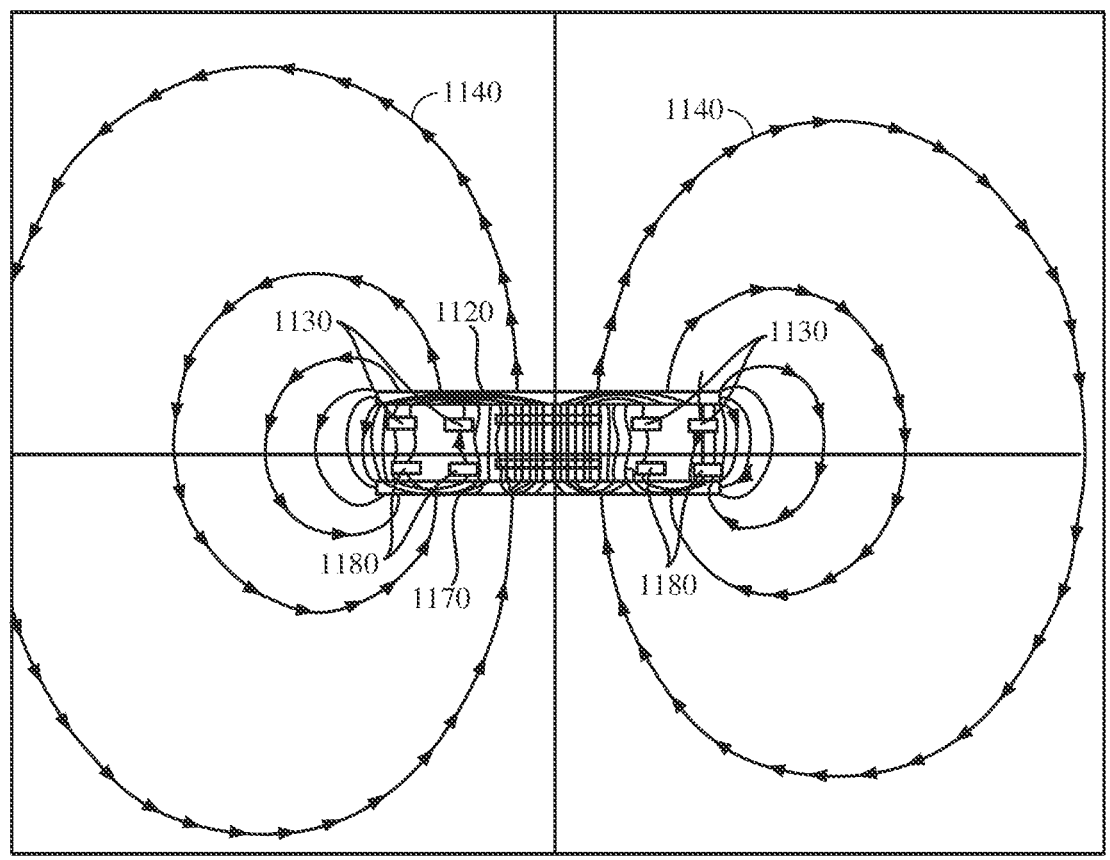

FIGS. 11A and 11B illustrate electromagnetic fields around a loop antenna and accompanying ferrite backing. A transmit antenna includes a wire loop 1130, which may comprise a multi-turn wire loop, and a ferrite backing 1120 and a receive antenna includes a wire loop 1180 and a ferrite backing 1170. At VLF and LF frequencies, a ferrite backing may be useful for intensifying the magnetic field 1140 in the space between the antennas thus for enhanced coupling. As shown in FIG. 11A, if the separation between the antenna coils 1130 and 1180 and the ferrite backings 1120 and 1170 is reduced to 0 cm, the coupling coefficient between the transmit antenna and receive antenna decreases slightly. Consequently, there may be an ideal separation between the antenna coils 1130 and 1180 and the ferrite backings 1120 and 1170. FIG. 11B, illustrates a small separation between the antenna coils 1130 and 1180 and the ferrite backings 1120 and 1170. In addition, a reduced spacing is illustrated between the antenna coils 1130 and 1180 and their respective ferrite backings 1120 and 1170. For smaller transmission distances (e.g., 3 cm), the performance gain of ferrite backing may be less because the coupling coefficient is very high already.

Figure 12:
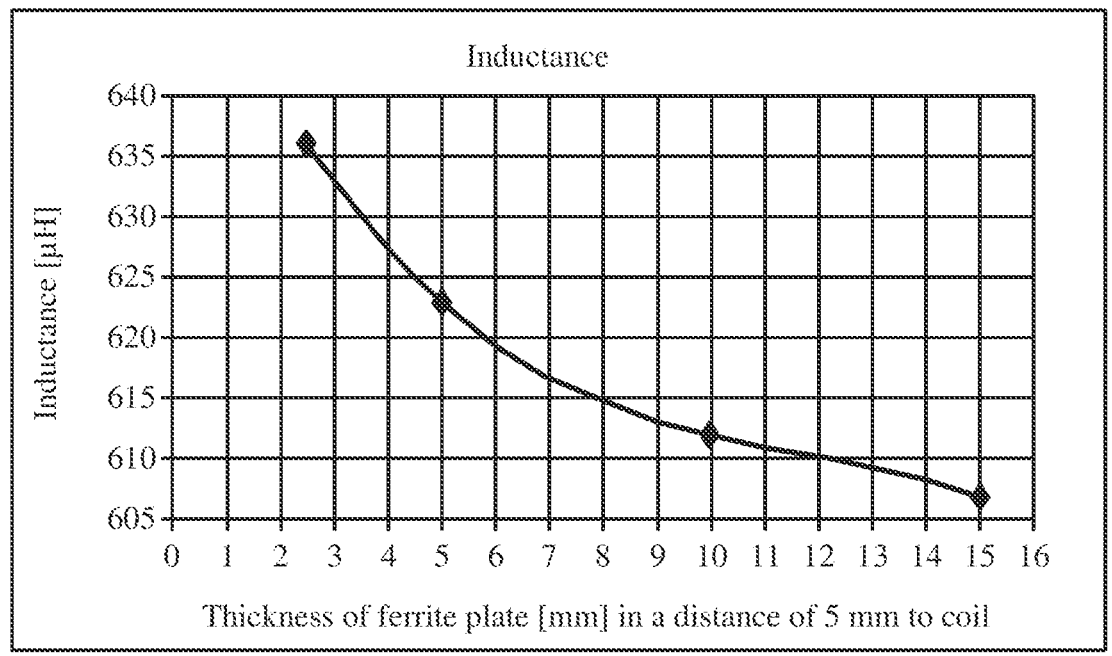
FIG. 12 is a graph illustrating possible inductance values for various thicknesses of a ferrite backing as part of a wireless power antenna.

FIG. 12 is a graph illustrating possible inductance values for various thicknesses of a ferrite backing as part of a wireless power antenna. In the exemplary embodiment for FIG. 12 the ferrite backing is about 0.5 cm from the coil. It can be seen that inductance does not change considerably (i.e., about 5%) with a thickness change for the ferrite backing between about 5 mm and 10 mm.

Figure 13:
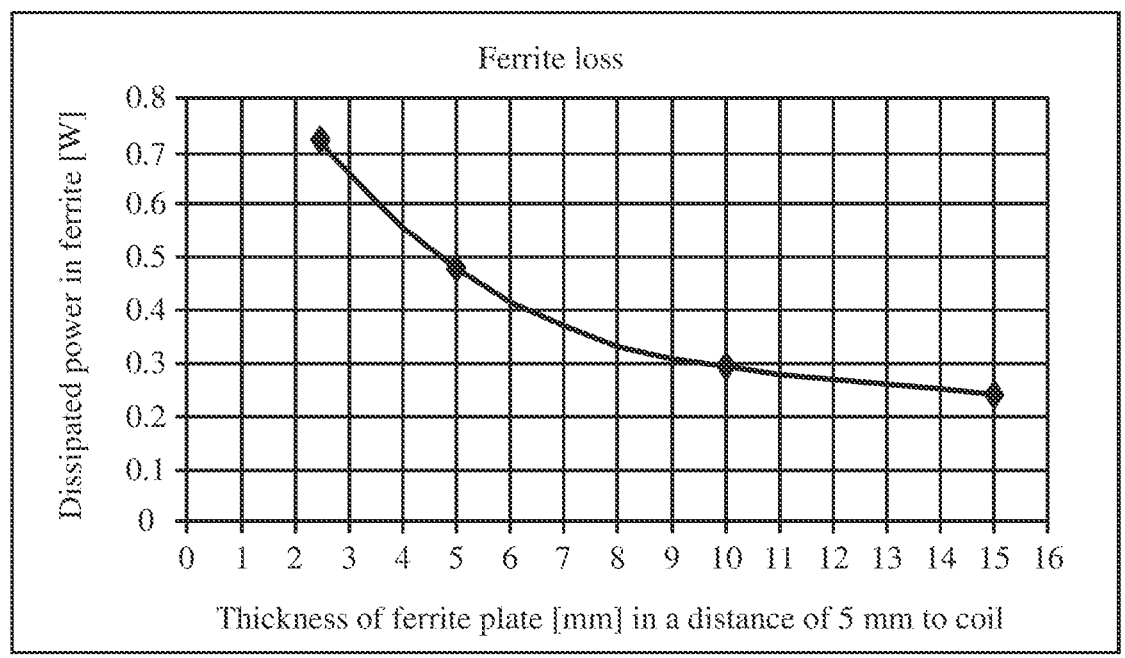
FIG. 13 is a graph illustrating possible ferrite loss values for various thicknesses of a ferrite backing as part of a wireless power antenna.

FIG. 13 is a graph illustrating possible ferrite loss values for various thicknesses of a ferrite backing as part of a wireless power antenna. In the exemplary embodiment for FIG. 12 the ferrite backing is about 0.5 cm from the coil. It can be seen that losses increase rapidly (i.e., about 185%) with a thickness change for the ferrite backing between about 5 mm and 10 mm. The resulting loss may decrease the Q factor. As a result, a trade-off may need to be made between performance relative to considerations such as volume, weight, and cost.

Figure 14:
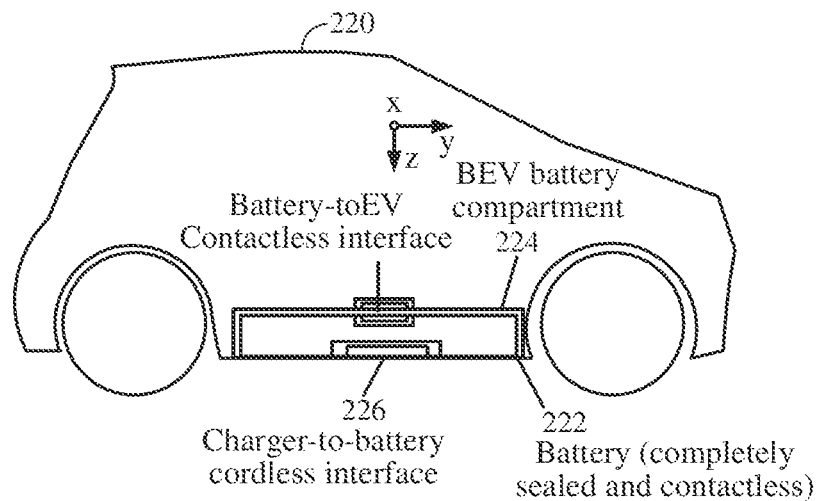
FIG. 14 shows a simplified diagram of a replaceable contactless battery disposed in a BEV.

FIG. 14 shows a simplified diagram of a replaceable battery disposed in a battery electric vehicle (BEV) 220. In this exemplary embodiment, The BEV side of the wireless energy transfer system is an integral part of the vehicles battery unit 222. Present movements towards standardized EV batteries may enable easy and fast replacement in so-called battery swapping (or switching) stations. As shown in FIG. 14, the shape and placement of the battery unit 222 are illustrative of one exemplary embodiment. Many other configurations are possible. As a non-limiting example, the bulk of the battery may be below the rear seat.

However, the low battery position may be useful for a battery unit that integrates a wireless power interface and that can receive power from a charger embedded in the ground. Fast battery replacement will likely continue to coexist with corded and wireless BEV charging and will not totally supersede any alternative charging solution (e.g., wireless charging). In battery swapping stations motorists can get a fully recharged battery perhaps in less than a minute (faster than refueling in a conventional gas stations), while corded and wireless charging will be the solution at home and for opportunistic charging in public and private parking lots to increase vehicles autonomy time.

Due to high capital expenditure issues, deployments of battery swapping stations may be mainly along major transport axis and in larger cities. Another strong argument for a decentralized and in particular for a convenient charging and docking-to-grid solution is the availability of BEVs for vehicle-to-grid use as explained above.

In FIG. 14, the EV replaceable battery unit 222 is accommodated in a specially designed battery compartment 224. The battery unit 222 also provides a wireless power interface 226, which may integrate the entire BEV sided wireless power subsystem comprising the resonant magnetic antenna, power conversion and other control and communications functions needed for efficient and safe wireless energy transfer between a ground embedded charging base (CB) and the Electric Vehicle (EV) battery.

It may be useful for the BEV antenna to be integrated flush with a bottom side of battery unit 222 (vehicle body) so that there are no protrusive parts and so that the specified ground-to-vehicle body clearance can be maintained. This configuration may require some room in the battery unit dedicated to the wireless power subsystem.

In some exemplary embodiments, the CB antenna and the BEV antenna are fixed in position and the antennas are brought within a near-field coupling region by overall placement of the BEV relative to the CB. However, in order to perform energy transfer rapidly, efficiently, and safely, the distance between the charging base antenna and the BEV antenna may need to be reduced to improve magnetic coupling. Thus, in some exemplary embodiments, the CB antenna and the BEV antenna may be deployable moveable to bring them into better alignment.

Figure 16:
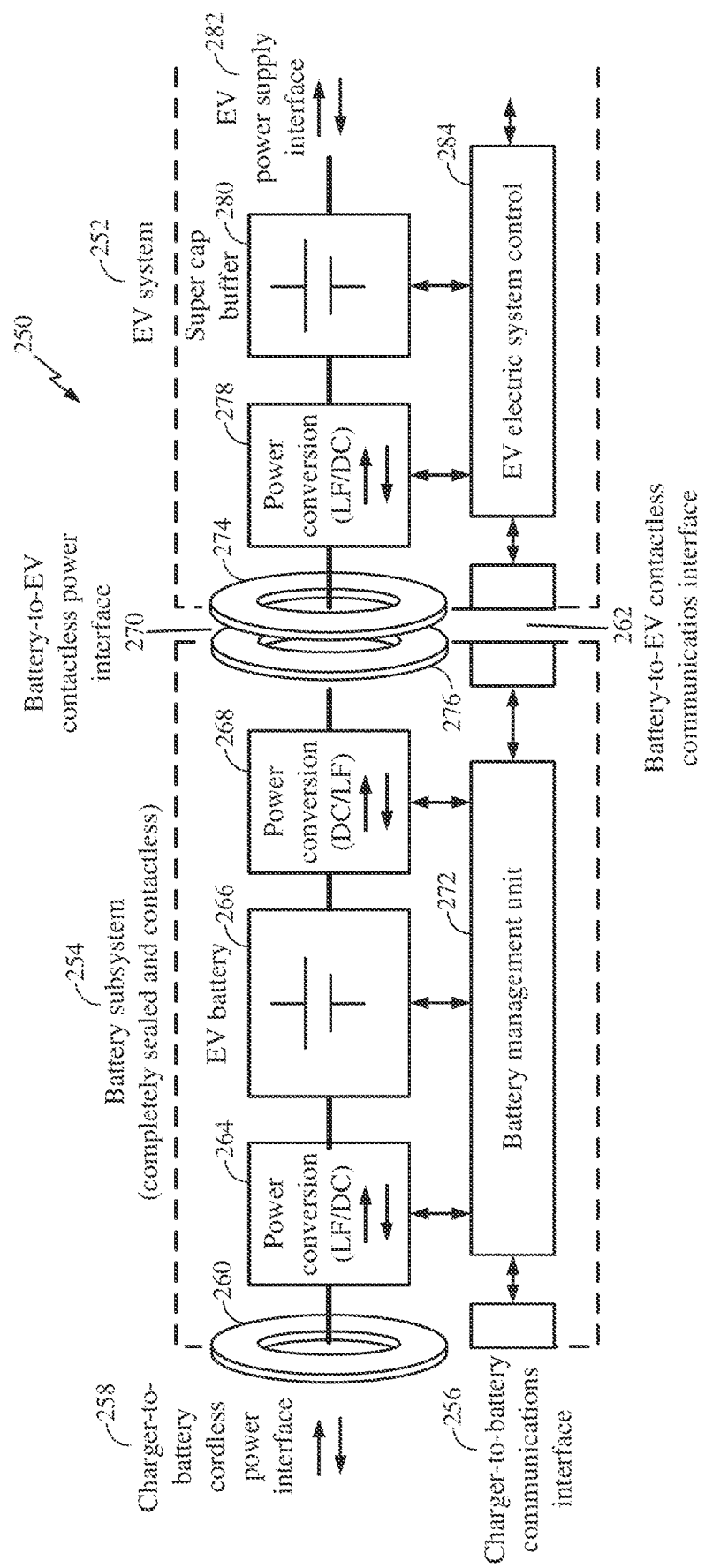
FIG. 16 is a simplified block diagram of portions of a battery system in a BEV equipped to wirelessly receive or transmit power.

Also illustrated in FIG. 14 is a battery unit 222 that is completely sealed and that provides contactless power and communications interfaces 226,228. A conceptual block diagram of this exemplary embodiment is illustrated in FIG. 16.

FIGS. 15A-15D are more detailed diagrams of a loop antenna and ferrite material placement relative to a battery. In these exemplary embodiments, the battery unit includes a non-deployable BEV antenna module as part of the wireless power interface. To prevent magnetic fields from penetrating into the battery unit 230 and into the interior of the vehicle, there may be a conductive shielding 232 (e.g., a copper sheet) between the battery unit and the vehicle. Furthermore, a non-conductive (e.g., plastic) layer 234 to may be used protect the conductive shield 232, the coil 236, and the ferrite material 238 from all sorts of environmental impacts (e.g., mechanical damage, oxidization, etc.).

Figure 15A:
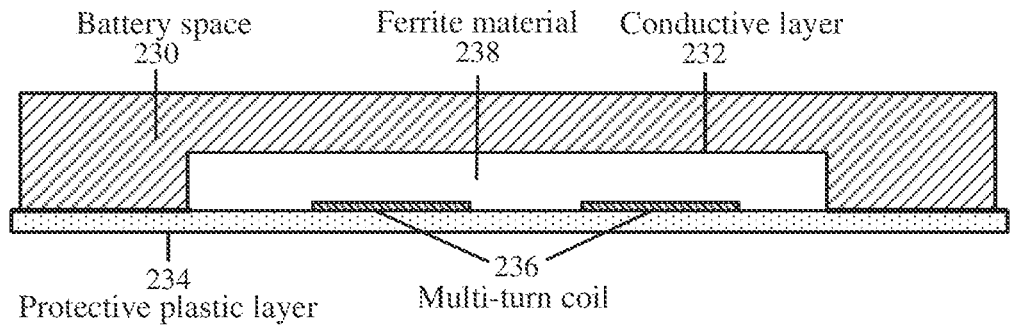
FIGS. 15A-15D are more detailed diagrams of a wireless power antenna and ferrite material placement relative to a battery.
Figure 15B:
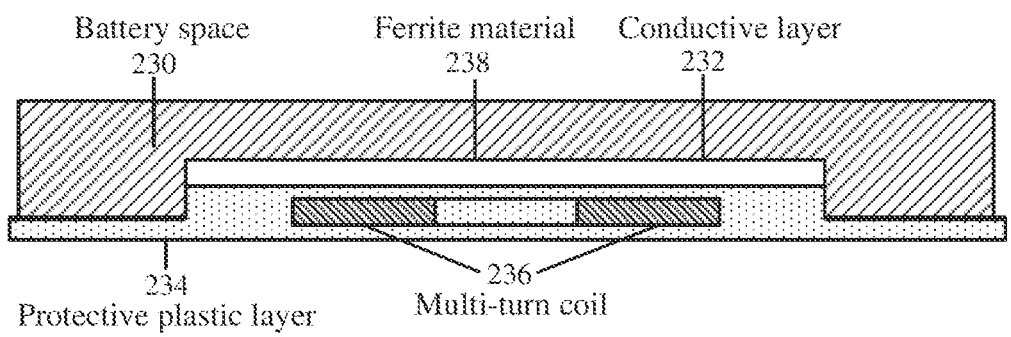

FIG. 15A shows a fully ferrite embedded antenna coil 236. The coil 236 itself may be made, for example only, of stranded Litz wire. FIG. 15B shows an optimally dimensioned ferrite plate (i.e., ferrite backing) to enhance coupling and to reduce eddy currents (heat dissipation) in the conductive shield 232. The coil may be fully embedded in a non-conducting non-magnetic (e.g. plastic) material 234. There may be a separation between coil and ferrite plate in general, as the result of an optimum trade-off between magnetic coupling and ferrite hysteresis losses.

Figure 15C:
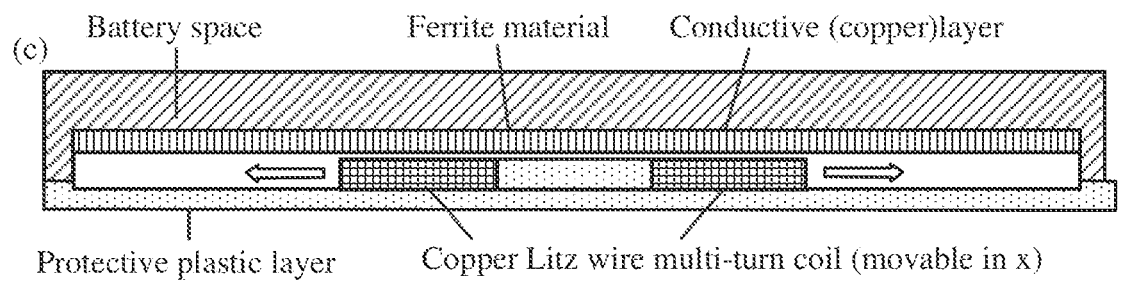
Figure 15D:
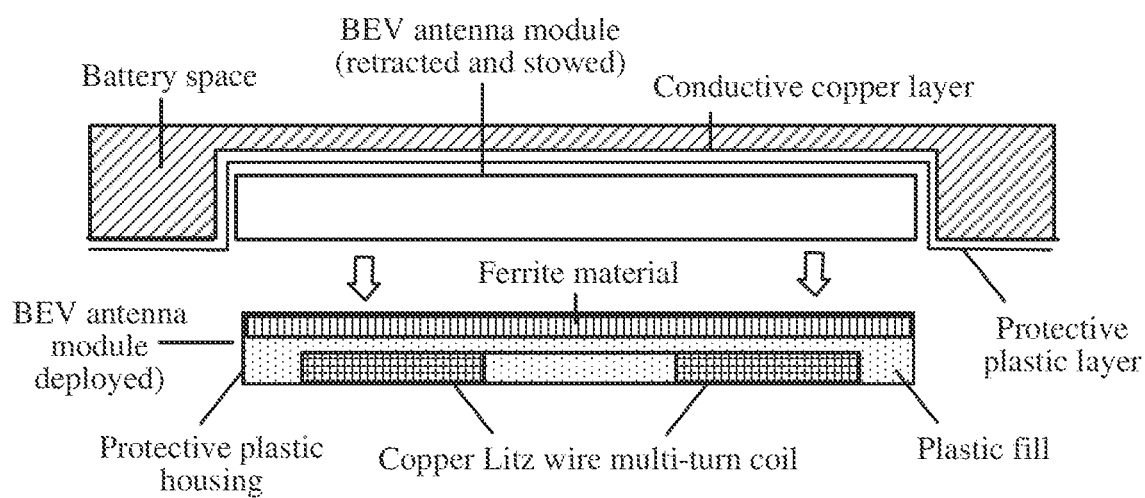

FIG. 15C illustrates another exemplary embodiment wherein the coil may be movable in a lateral ("x") direction. FIG. 15D illustrates another exemplary embodiment wherein only the antenna (coil) module is deployed in a downward direction. The design of this deployable module is similar to that of FIG. 15B except there is no conductive shielding at the antenna module. The conductive shield stays with the battery unit. The physical separation of the antenna module from the battery unit will have a positive effect on the antennas performance. However, the solution may be more fault-prone in considering the harsh environmental conditions below a vehicles body (pollution, icing, water).

FIG. 16 is a simplified block diagram of portions of a battery system 250 in a BEV equipped to receive wireless power. This exemplary embodiment illustrates wireless power interfaces that may be used between an EV system 252, a battery subsystem 254, and the wireless charging interface to a CB (not shown). The battery subsystem 254 provides for both energy transfer and communications with a wireless interface between the EV and the battery subsystem 254, which enables a completely contactless, closed, and sealed battery subsystem 254. The interface may include all the required functionality for bidirectional (two-way) wireless energy transfer, power conversion, control, battery management, and communications.

The charger to battery communication interface 256 and wireless power interface 258 has been explained above and it shall be noted again that FIG. 16 shows a generic concept. In specific embodiments, the wireless power antenna 260 and the communications antenna may be combined to a single antenna. This may also apply to the battery-to-EV wireless interface 262. The power conversion (LF/DC) unit 264 converts wireless power received from the CB to a DC signal to charge the EV battery 266. A power conversion (DC/LF) 268 supplies power from the EV battery 266 to a wireless power interface 270 between the battery subsystem 254 and the EV system 252. A battery management unit 272 may be included to manage EV battery charging, control of the power conversion units (LF/DC and DC/LF), as well as a wireless communication interface.

In the EV system 252, a wireless antenna 274 receives power from antenna 276 and a LF/DC power conversion unit 278 may supply a DC signal to a super capacitor buffer 280. In some exemplary embodiments LF/DC power conversion unit 278 may supply a DC signal directly to the EV power supply interface 282. In other exemplary embodiments, a contactless interface may not be capable of providing the high battery peak current required by the vehicles drive train e.g., during acceleration. To decrease the source resistance and thus the peak power capability of the EVs energy storage system as "seen" at the EV power supply terminals, an additional super capacitor buffer may be employed. An EV electrical system control unit 284 may be included to manage control of the power conversion unit (LF/DC) 278, charging of the super capacitor buffer 280, as well as a wireless communication interface 262 to the EV and the battery subsystem 254. Furthermore, it is noted that V2G capabilities, as described above, may apply to the concepts described with reference to, and illustrated in, FIG. 16.

Exemplary embodiments of the present invention, as described below, are directed toward alignment of wireless power antennas as part of a wireless charging system for BEVs (also referred to herein as a "BEV wireless charging system"). As will be appreciated by a person having ordinary skill in the art, adequate antenna alignment may enable two-way (bidirectional) energy transfer between a charging base, positioned within a parking space, and a BEV subsystem, in a quick, efficient, and safe manner. According to one or more exemplary embodiments, a vehicle guidance system may provide coarse alignment for adequately positioning a BEV within a parking space to enable a CB antenna and a BEV antenna to be aligned within a specific error radius. Furthermore, according to one or more other exemplary embodiments, an antenna alignment system may be configured to mechanically adjust a position of a CB antenna, a BEV antenna, or both in one or more directions to enable for fine alignment of antennas within a BEV wireless charging system.

Figure 17:
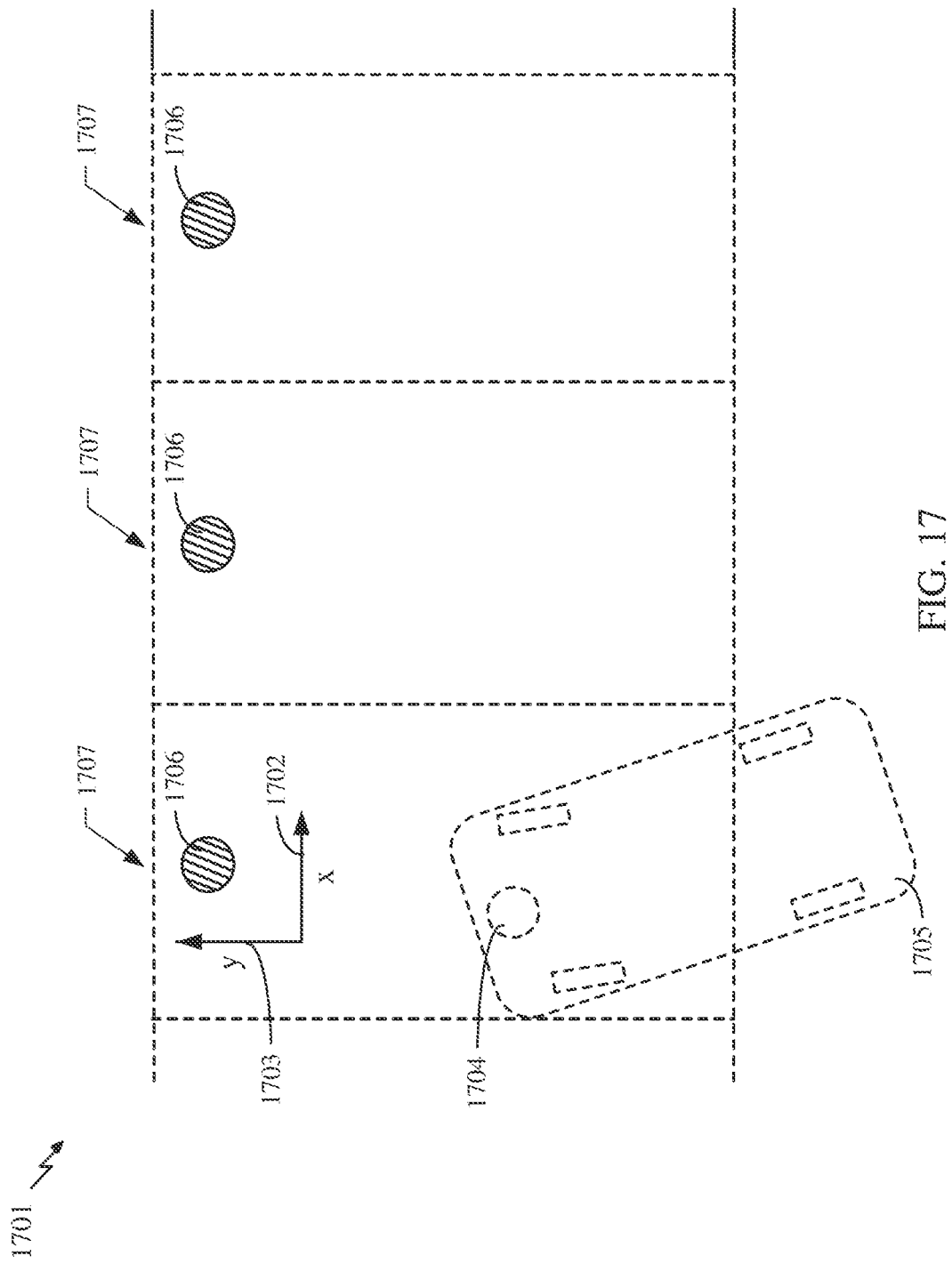
FIG. 17 illustrates a parking lot comprising a plurality of parking spaces and a charging base positioned within each parking space, in accordance with an embodiment of the present invention.

FIG. 17 illustrates a parking lot 1701 comprising a plurality of parking spaces 1707. It is noted that a "parking space" may also be referred to herein as a "parking area." To enhance the efficiency of a vehicle wireless charging system, a BEV 1705 may be aligned along an X direction (depicted by arrow 1702 in FIG. 17) and a Y direction (depicted by arrow 1703 in FIG. 17) to enable a wireless power vehicle base 1704 within BEV 1705 to be adequately aligned with a wireless power charging base 1706 within an associated parking space 1707. Although parking spaces 1707 in FIG. 17 are illustrated as having a single charging base 1706, embodiments of the present invention are not so limited. Rather, it is contemplated that parking spaces may have one or more charging bases. Furthermore, embodiments of the present invention are applicable to parking lots having one or more parking spaces, wherein at least one parking space within a parking lot may comprise a charging base.

Figure 18:
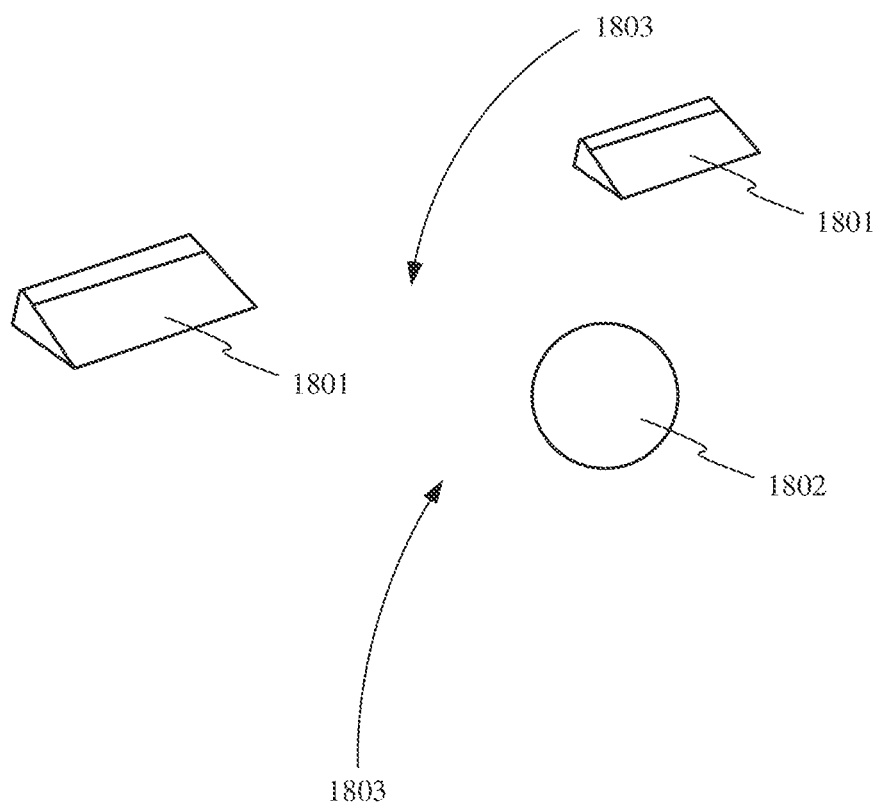
FIG. 18 illustrates a pair of tire stops positioned within a parking space having a charging base positioned therein.

FIG. 18 illustrates a plurality of tire stops 1801 (also commonly referred to as "wheel stops" or "garage stops") that may be used to assist a vehicle operator in positioning a BEV in a parking space 1803 to enable a vehicle base (e.g., vehicle base 1704; see FIG. 17) within the BEV to be aligned with a charging base 1802. Furthermore, according to one or more exemplary embodiments, global navigation systems (e.g., GPS, Galileo), augmentation systems (e.g., satellite based or ground based), or any combination thereof, may be used for assisting a BEV operator in positioning a BEV to enable a an antenna within the BEV to be adequately aligned with a charging antenna within a charging base (e.g., charging base 1706).

Figure 19:
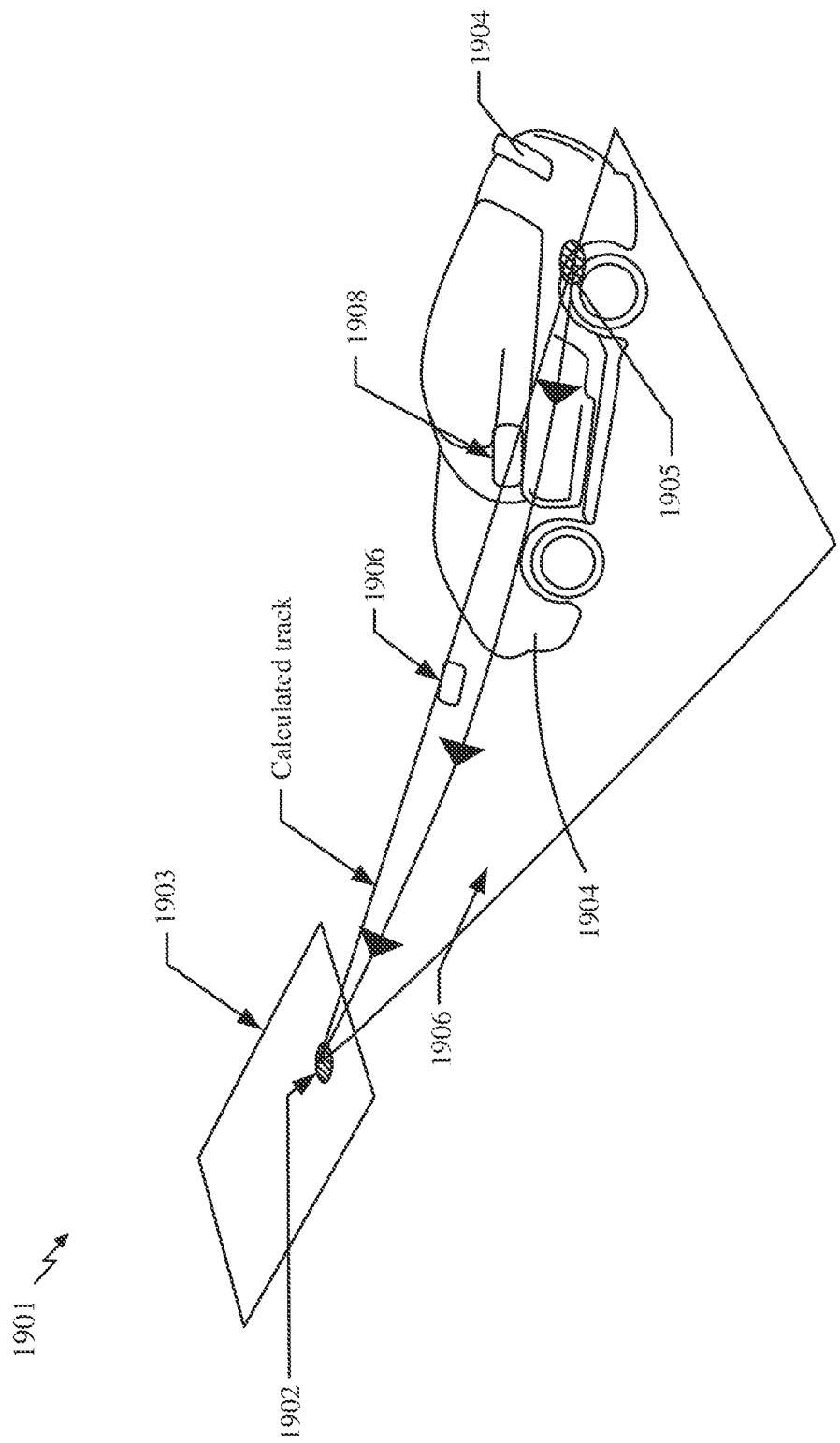
FIG. 19 illustrates a BEV approaching a charging spot by using a guidance system, in accordance with an exemplary embodiment of the present invention.

Furthermore, a BEV guidance system, according to other various exemplary embodiments of the present invention, may be utilized for positioning a BEV within a parking space to adequately align associated antennas. FIG. 19 illustrates a guidance system 1901 comprising at least one charging base 1902 positioned within a parking space 1903 and at least one vehicle base 1905 integrated within a BEV 1904. Furthermore, an alignment system 1908 may be integrated within BEV 1904 and may be operably coupled to vehicle base 1905. It is noted that charging base 1902 may include one or more antennas (not shown in FIG. 19; e.g., see FIGS. 21 and 22) and vehicle base 1905 may include one or more antennas (also not shown in FIG. 19; e.g., see FIGS. 21 and 22). As described more fully below, a vehicle guidance system may be based on radio positioning and direction finding principles and/or on optical, quasi-optical and/or ultrasonic sensing methods.

Figure 20:
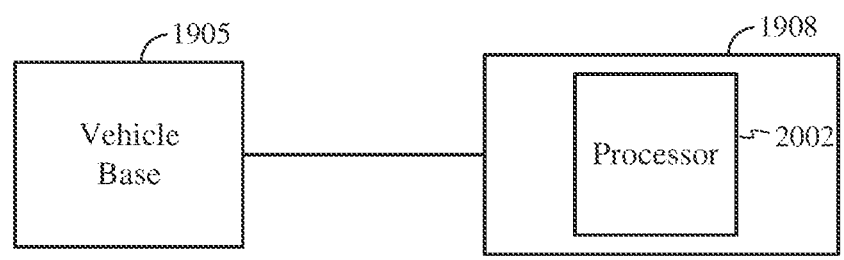
FIG. 20 depicts a block diagram of a portion of a guidance system, in accordance with an exemplary embodiment of the present invention.

FIG. 20 illustrates a block diagram of a portion of a guidance system 2001, in accordance with an exemplary embodiment of the present invention. More specifically, with reference to FIGS. 19 and 20, portion of guidance system 2001 may comprise vehicle base 1905 operably coupled to alignment system 1908. As illustrated, alignment system 1908 may include at least one processor 2002 and may be configured to visually convey information to a BEV operator, audibly convey information to a BEV operator, or both, to assist the BEV operator to properly position an associated BEV within a parking space to enable for associated antennas to be aligned within a specific error radius. Furthermore, alignment system 1908 may comprise an autopilot system, or may be configured to control an autopilot system, which is configured to automatically position an associated BEV within a parking space.

Figure 21:
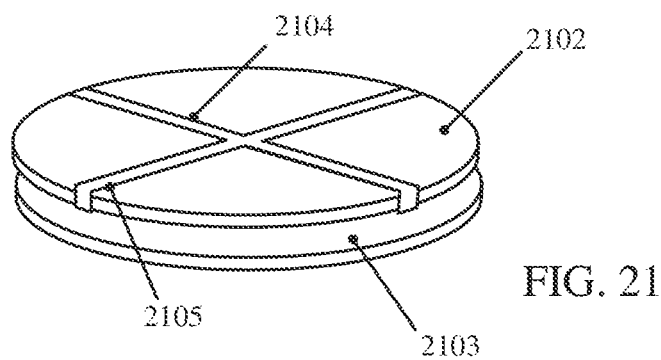
FIG. 21 illustrates a receive antenna, according to an exemplary embodiment of the present invention.
Figure 22:
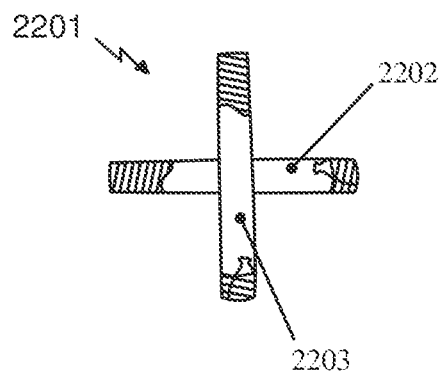
FIG. 22 depicts another receive antenna, according to an exemplary embodiment of the present invention.

FIGS. 21 and 22 respectively illustrate examples of antennas 2101 and 2201, which may be used in implementation of guidance system 1901 (see FIG. 19). With reference to FIG. 21, antenna 2101 comprises a ferrite disk 2102 coupled to an antenna 2103. Antenna 2101 may further comprise an x-antenna magnetic element 2104 and an orthogonally oriented y-antenna magnetic element 2105. With reference to FIG. 22, antenna 2201 may comprise a ferrite rod x-antenna magnetic element 2202 and a ferrite rod y-antenna magnetic element 2203 that is orthogonal to ferrite rod x-antenna magnetic element 2202. Moreover, it is noted that charging base 1902 (see FIG. 19) may include one or more known and suitable antennas. For example only, charging base 1902 may include one or more antennas configured for generating a polarized magnet field. Furthermore, in another example, charging base 1902 may include one or more antennas configured for generating a rotating (i.e., circular polarized) magnet field.

By way of example only, charging base 1902 may include at least one antenna having orthogonal x and y magnetic elements, similar to antenna 2101 or antenna 2201, as illustrated in FIGS. 21 and 22, respectively. It is noted that, according to one exemplary embodiment, the antennas configured for wireless power transfer may also be configured for use in the guidance system 1901 e.g. for positioning and direction finding purposes. According to another exemplary embodiment, charging base 1902 may include one or more antennas for use within guidance system 1901 and one or more separate antennas for wireless power transmission.

With reference again to FIG. 19, and, as will be described more fully below, during a contemplated operation of BEV guidance system 1901, charging base 1902 may be configured to convey, via one or more transmitters, a guidance signal 1906, which may be received by vehicle base 1905. Upon receipt of guidance signal 1906, vehicle base 1905, and, more specifically, alignment system 1908 may be configured to utilize information derived from guidance signal 1906 to assist a driver of BEV 1904, a controller of alignment system 1908 (e.g., an autopilot system controller), or a combination thereof, to direct BEV 1904 in an X direction (see arrow 1702 in FIG. 17), a Y direction (see arrow 1703 in FIG. 17), or a combination thereof, to enable at least one wireless power antenna of vehicle base 1905 to be adequately aligned with at least one wireless power antenna of charging base 1902. More specifically, alignment system 1908 may be configured to utilize information derived from guidance signal 1906 to enable at least wireless power antenna of vehicle base 1905 to be adequately aligned with at least one wireless power antenna of charging base 1902.

Various contemplated methods of implementing guidance system 1901 for positioning a BEV within a parking space will now be described. According to one exemplary embodiment, charging base 1902 may be configured to generate one or more magnetic fields, which may be detected by vehicle base 1905 and used for determining a direction from vehicle base 1905 to charging base 1902. More specifically, in this embodiment, guidance signal 1906 may comprise one or more very low frequency (VLF) (i.e., 3-30 KHz) or low frequency (LF) (i.e., 30-300 KHz) magnetic field patterns, which may be generated by charging base 1902 and received by one or more VLF or LF receive antennas of vehicle base 1905, wherein the one or more receive antennas include orthogonal x and y components (e.g., antenna 2101 or antenna 2201). Furthermore, a direction of a horizontal field component of the magnetic field, which points toward charging base 1905, may be determined from signals received by the one or more receive antennas of vehicle base 1905. Stated another way, a horizontal component of a magnetic field generated from at least one antenna within charging base 1905 may be detected by at least one antenna with vehicle base 1905, wherein the horizontal component is directed toward the at least one antenna with vehicle base 1905.

Figure 23:
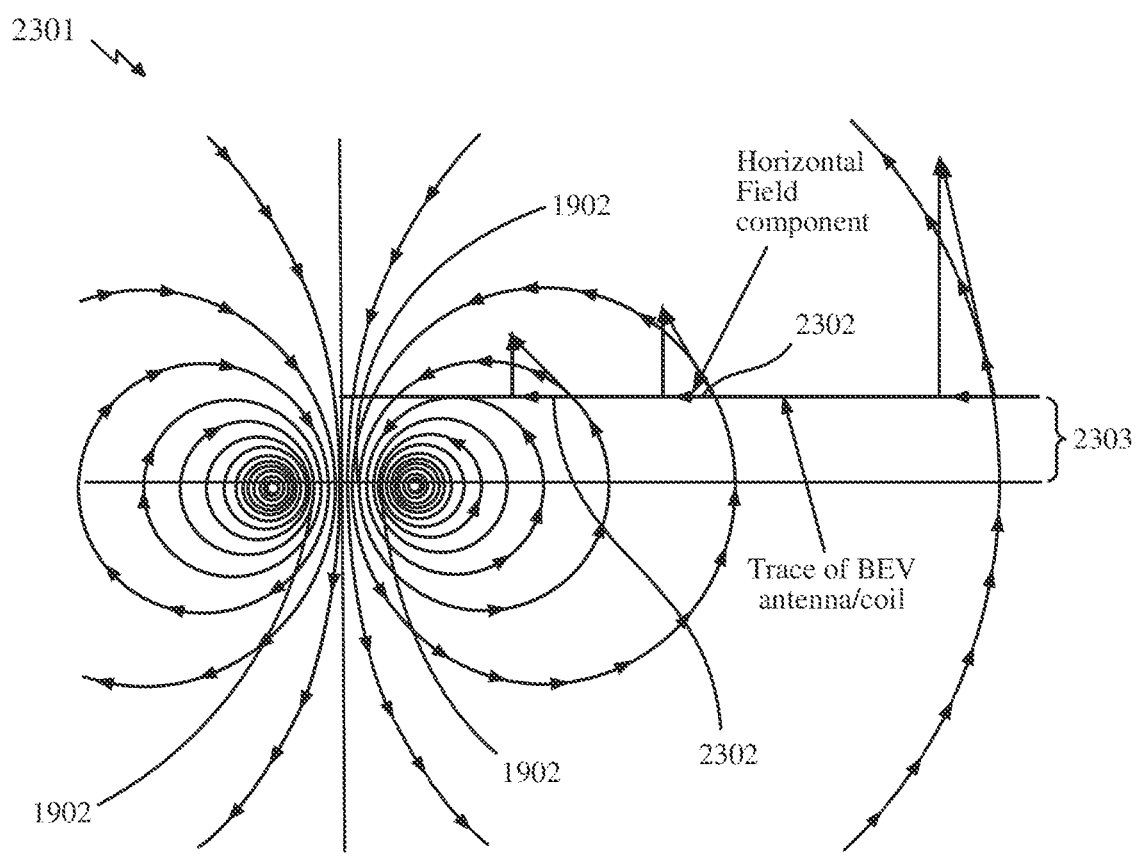
FIG. 23 depicts a magnetic field generated by a transmit antenna of a charging base, in accordance with an exemplary embodiment of the present invention.
Figure 25:
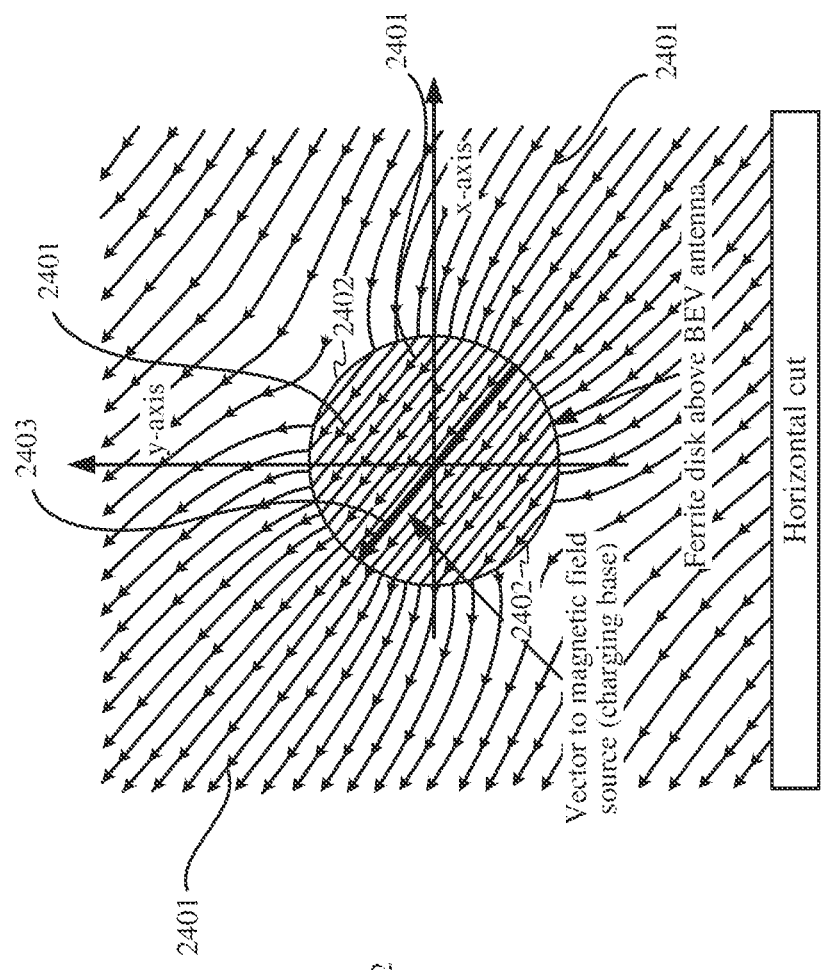
FIG. 25 illustrates a top-down view of a receive antenna positioned within a magnetic field, according to an exemplary embodiment of the present invention.
Figure 24:
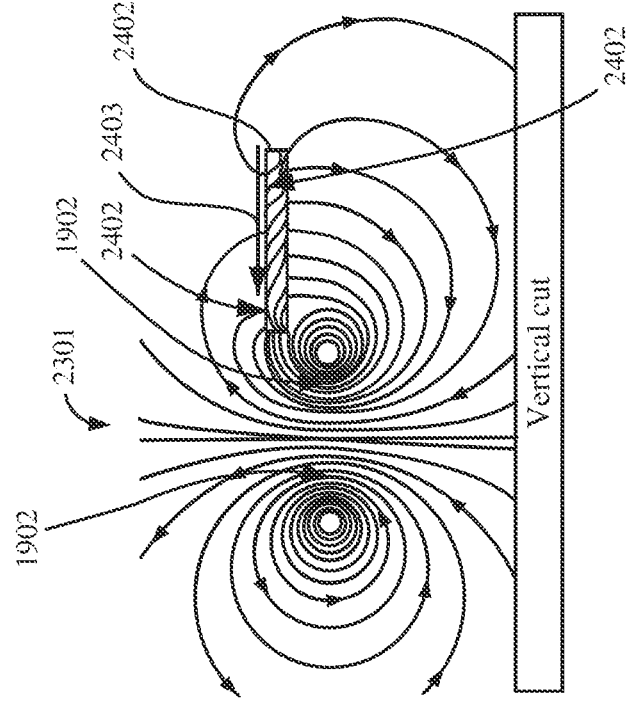
FIG. 24 illustrates a side-view of a receive antenna and a charging base emitting a magnetic field, according to an exemplary embodiment of the present invention.

FIG. 23 illustrates a side view of a magnetic field 2301 generated by charging base 1902. With reference to FIGS. 19 and 23, charging base 1902 may generate magnetic field 2301 having a horizontal field component 2302, which may be received by one or more antennas of vehicle base 1905. It is noted that reference numeral 2303 depicts an offset between charging base 1902 and vehicle base 1905. FIG. 24 illustrates a side view of an antenna 2402 (i.e., an antenna of vehicle base 1905) and charging base 1902 emitting magnetic field 2301. FIG. 25 illustrates a top-down view of antenna 2402 positioned within magnetic field 2301. With reference to FIGS. 24 and 25, the direction of the flux lines 2401 of magnetic field 2301 adjacent antenna 2402 (e.g., antenna 2101 or antenna 2201) of vehicle base 1905 (see FIG. 19) may be oriented along a horizontal field component of magnetic field 2301 and in a direction toward charging base 1902. Stated another way, the orientation of flux lines 2401 adjacent antenna 2402 may be defined by a vector 2403, which points toward the source of magnetic field 2301 (i.e., one or more antennas within charging base 1902).

According to one exemplary embodiment, alignment system C08 (see FIGS. 19 and 20) may include a processor 2002 (see FIG. 20), which may be configured to calculate a direction of vector 2403 from one or more signals received from orthogonal x and y magnetic elements (e.g., x-antenna 2104 and y-antenna 2105) of an antenna (e.g., antenna 2402) of vehicle base 1905. Stated another way, processor 2002 may determine the vector between at least one antenna within vehicle base 1905 to at least one antenna within charging base 1902. It is noted that a ferrite disk (e.g., ferrite disk 2102 of FIG. 21) may concentrate and/or magnify a horizontal field component of magnetic field 2301 and, as a result, the horizontal field component may be more easily detected.

By way of example only, charging base 1902 may be configured to generate radio wave magnetic fields, which, as will be understood by a person having ordinary skill in the art, may not require an unobstructed line of sight and are not easily obstructed by objects within a surrounding environment (e.g., snow, pollution, or other objects). Moreover, charging base 1902 may be configured to reduce, and possibly eliminate, multi-path propagation effects (i.e., reflections from surrounding objects). In other examples, charging base 1902 may be configured to emit or receive signals at optical or infrared frequencies.

Furthermore, according to another exemplary embodiment of determining a direction from vehicle base 1905 to charging base 1902, guidance system 1901 may be configured to function in a manner similar to that of a radio navigation system (e.g., VHF Omni-directional Radio Range "VOR"), as will be understood by a person having ordinary skill in the art. In this exemplary embodiment, guidance signal 1906 may comprise a direction signal (e.g., a circular polarized H-field) and a time-reference signal. Furthermore, vehicle base 1905 may be configured to receive each of the directional signal and the reference signal and measure a phase difference therebetween to determine a line of position, from charging base 1902, on which vehicle base 1905 is located.

Additionally, for the exemplary embodiments described above related to positioning a BEV within a parking space, guidance system 1901 may be configured to measure a change in a strength of guidance signal 1906 (see FIG. 19) emitted from charging base 1902 to determine a position of vehicle base relative to charging base 1902. The BEV may solely use or additionally use the gradient of the field strength of the guidance signal to find to a location of the charging base. This may enable use of simplified receivers within the BEV. Moreover, it is noted that for the exemplary embodiments described above related to magnetic field detection, a guidance system (e.g., guidance system 1901) should be configured to detect a magnetic field emitted from an associated charging base without being affected by the presence of magnetic fields produced by adjacent charging bases for the purpose of wireless energy transfer, for the purpose of vehicle guidance, or both.

Figure 26:
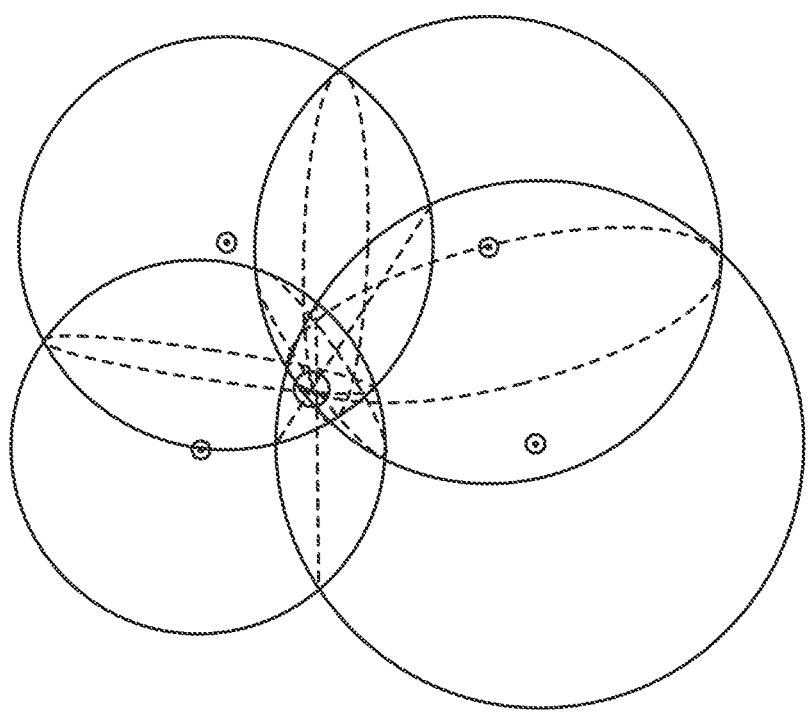
FIG. 26 illustrates four ultra wide band transponders for use within a triangulation process, according to an exemplary embodiment of the present invention.

Furthermore, exemplary embodiments of the present invention include devices, systems and methods for employing ultra wide band (UWB) location technologies. Ultra wide band localizers may be based on distance measurement through measurement of a round-trip time of a pulse or other suitable wideband waveforms, similarly to secondary surveillance radar used in air traffic control or satellite ranging techniques. In an exemplary embodiment, multiple UWB transponders as part of the charging base are suitably positioned within a parking lot area and there is one UWB transceiver as part of the BEV subsystem having an antenna suitably installed e.g. within the BEV wireless power antenna. The BEV transceiver emits a UWB signal which when received by the UWB transponders triggers a response signal in each of the transponders. These response signals are preferably of the same waveform but delayed in time by a fixed and known amount or shifted in frequency or both, relative to the received signal. The BEV transceiver in turn measures time of arrival of all response signals and determines round-trip-time and related distance between its UWB antenna and each of the transponders. For example, by positioning multiple ranging devices within charging base 1902, a position of charging base 1902 relative to vehicle base 1905 may be determined through triangulation methods, as will be understood in the art. Ultra wide band location technologies may enable real-time, continuous position measurements with resolutions in the centimeter range. Moreover, code and time division channelization for a million localizers per $km^2$ may be achievable. FIG. 26 illustrates four ultra wide band transponders for use within a triangulation process.

In yet another exemplary embodiment using UWB guidance signals, there is a UWB transmitter as part of the charging base having an antenna suitably placed e.g. within the CB wireless power antenna and there are multiple UWB receivers as part of the BEV subsystem having antennas suitably placed on the BEV. The BEV-sided guidance system measures relative time of arrival of the UWB signal in each of its receivers to determine an angle of direction pointing to the charging base.

Above described methods using UWB electromagnetic signals for positioning or direction finding may also apply to the use of acoustic e.g. ultrasonic signals, emitters and sensors.

With reference again to FIG. 17, it is noted that each non-active charging base 1706 may be configured to emit a beacon signal at a very low frequency (VLF) (i.e., 3-30 KHz) or a low frequency (LF) (i.e., 30-150 KHz) and in a different frequency band in which wireless power is transmitted. Furthermore, each beacon signal may comprise a parking space identifier indicative of the parking space from which the beacon signal originated. This beacon signal may be identical with the guidance signal used for positioning or direction finding purposes. Moreover, beacon signals emitted by charging bases 1706 may share available resources in time, frequency, or both. Moreover, for the exemplary embodiments described above, a guidance system (e.g., guidance system 1901) may be configured to operate in a single, isolated parking space (e.g., a residential garage) and may not require use of triangulation methods involving charging bases of adjacent parking spaces.

Figure 27:
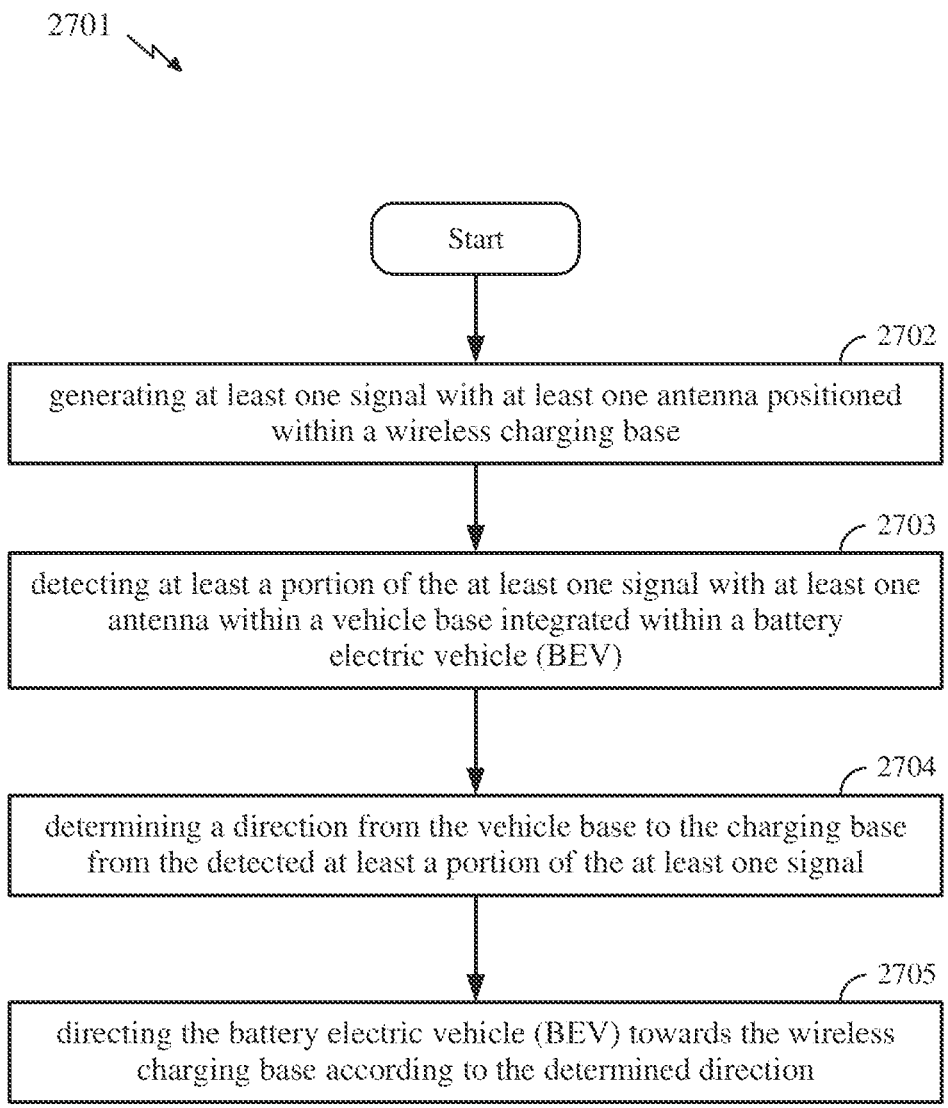
FIG. 27 is a flowchart illustrating a method, in accordance with an exemplary embodiment of the present invention.

FIG. 27 is a flowchart illustrating a method 2701, in accordance with one or more exemplary embodiments. Method 2701 may include generating at least one signal with at least one antenna positioned within a wireless charging base (depicted by numeral 2702). Method 2701 may further include detecting at least a portion of the at least one signal with at least one antenna within a wireless vehicle base integrated within a battery electric vehicle (BEV) (depicted by numeral 2703). Further, method 2701 may include determining a direction from the vehicle base to the charging base from the detected at least a portion of the at least one signal (depicted by numeral 2704). Moreover, method 2701 may include moving the battery electric vehicle (BEV) toward the wireless charging base according to the determined direction (depicted by numeral 2705).

The various exemplary embodiments described above with reference to FIGS. 17-27 may enable antennas within a BEV wireless charging system to be aligned within an error radius. In the event a residual antenna alignment error exists after a BEV has been positioned within a parking space, devices, systems, and methods related to fine alignment of antennas, as described below, may be utilized.

A wireless power charging and antenna alignment system includes a charging base configured to transmit or receive a wireless power signal to/from a BEV wireless charging subsystem. The BEV wireless charging subsystem may be operably coupled with a battery unit of a BEV. The system further includes a BEV antenna operably coupled with the BEV wireless charging subsystem. The system may further include a mechanical device configured for adjusting a physical position of the BEV antenna as described herein.

The BEV antenna may be positioned in a location of the BEV where there is enough space to integrate the BEV wireless charging subsystem with the other components and systems of the BEV. For example, the wireless power antenna may be located within the underside of the chassis of the BEV. The BEV antenna may be positioned near the front, center, or rear of the BEV. Positioning the wireless power antenna near the front of the BEV may result in the driver having more accuracy in positioning, as the wireless power antenna would be closer to the BEV's steering unit. Additionally, locating the wireless power antenna near the front of the BEV may provide more uniformity for overly long BEVs. Positioning the wireless power antenna near the center of the BEV may result in having more flexibility in parking forwards or backwards. Positioning the wireless power antenna near the rear of the BEV may be advantageous for system integration due to space constraints in the front and middle sections of the BEV. Other benefits for positioning the wireless power antenna near the front, middle, or rear of the BEV may also exist.

Figure 28A:
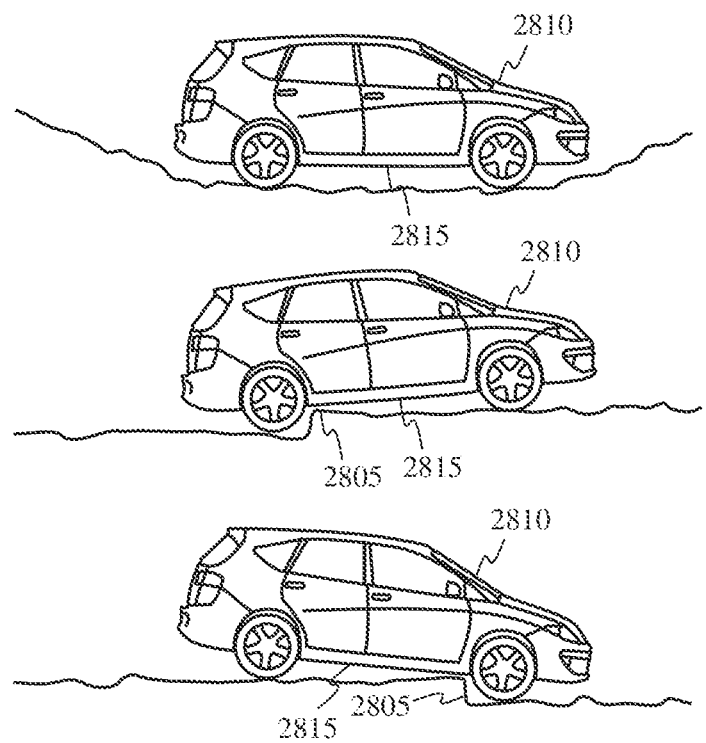
FIG. 28A illustrates various obstructions that may be encountered by a vehicle, which may require chassis clearance.

FIG. 28A illustrates that various obstructions 2805 may be encountered by a BEV 2810 requiring a minimum chassis clearance. The obstructions 2805 may contact the underside 2815 of the chassis of the BEV 2810 at different locations. When a wireless power antenna (not shown) is located within or near the underside 2815 of the chassis of the BEV 2810, the wireless power antenna may become damaged, misaligned, or have other problems associated with obstructions 2805 contacting the wireless power antenna.

Figure 28B:
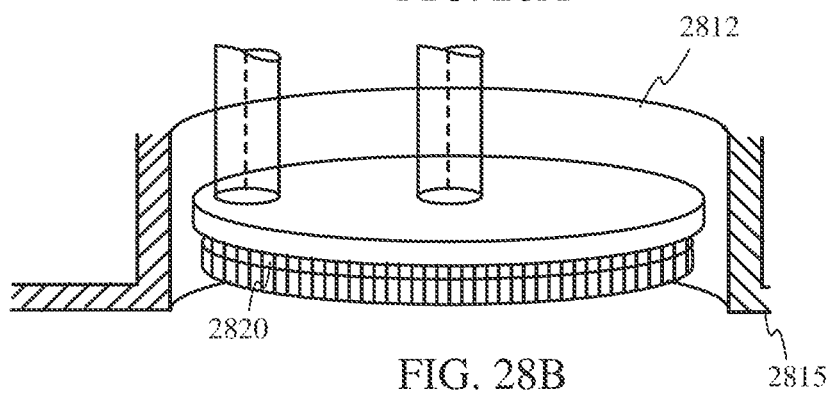
FIGS. 28B and 28C illustrate a wireless power antenna located within a cavity of the underside of the chassis of a vehicle according to an exemplary embodiment of the present invention.
Figure 28C:
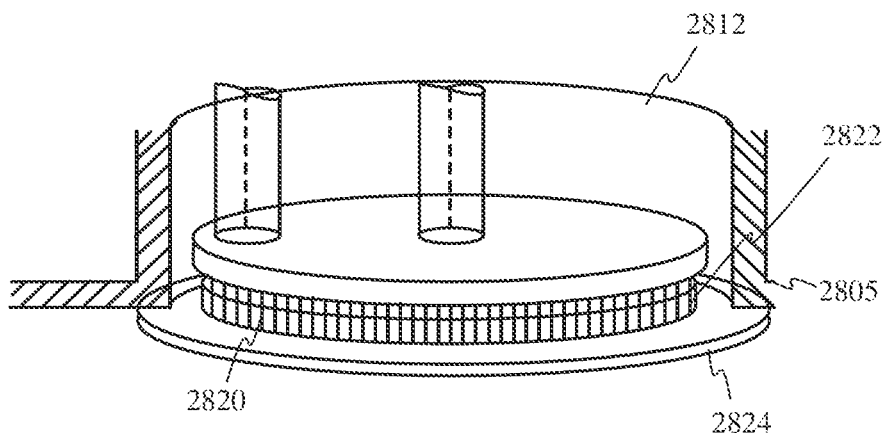

FIGS. 28B and 28C illustrate a BEV antenna 2820 according to an exemplary embodiment of the present invention. In order to protect the BEV antenna 2820 from undesirable contact from obstructions, it may be desirable to locate the BEV antenna 2820 within a cavity 2812 of the underside of the chassis of a BEV 2810. In order to further protect the wireless power antenna 2820 from environmental effects (e.g., pollution, dirt, mud, water, ice, moisture), a cover 2824 and/or defrost unit 2822 may be used. The defrost unit 2822 may be the wireless power antenna itself. In this concept the BEV wireless power subsystem may be operated in transmit mode injecting a current into the BEV antenna 2820 that produces sufficient heat dissipation.

Figure 29A:
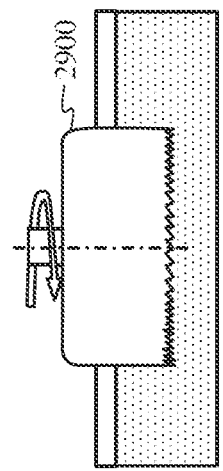
FIG. 29A illustrates a tool which may be used to drill a hole in the ground, in which a charging base may be at least partially embedded according to an exemplary embodiment of the present invention.
Figure 29A:
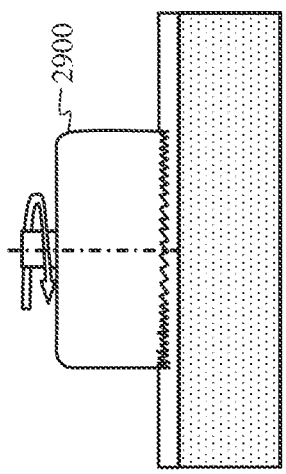
Figure 29A:
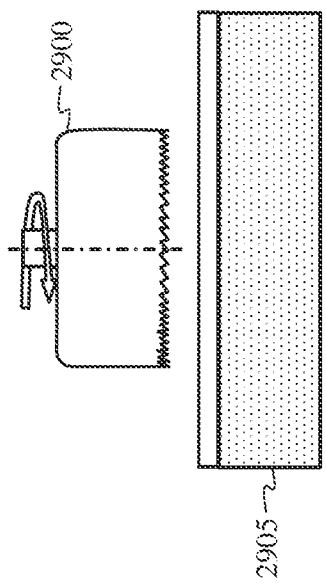

A charging base (not shown) may include a power conversion unit operably coupled with a CB antenna. The charging base may further include other mechanical or electronic components (e.g., processor) that may be used for position adjustment of the CB antenna as will be described herein. Components of the charging base may be housed within a charging base that is at least partially embedded below a ground surface, such as in a parking lot, driveway, or garage. A tool may be used to form the hole in which the charging base is located. For example, FIG. 29A illustrates a tool 2900 (e.g., milling cutter) which may be used to drill a hole in the ground 2905, in which a charging base may be at least partially embedded. As a result, the tool 2900 may be used to equip parking lots with charging bases in order to accelerate large scale deployments of wireless charging of BEVs.

Figure 29B:
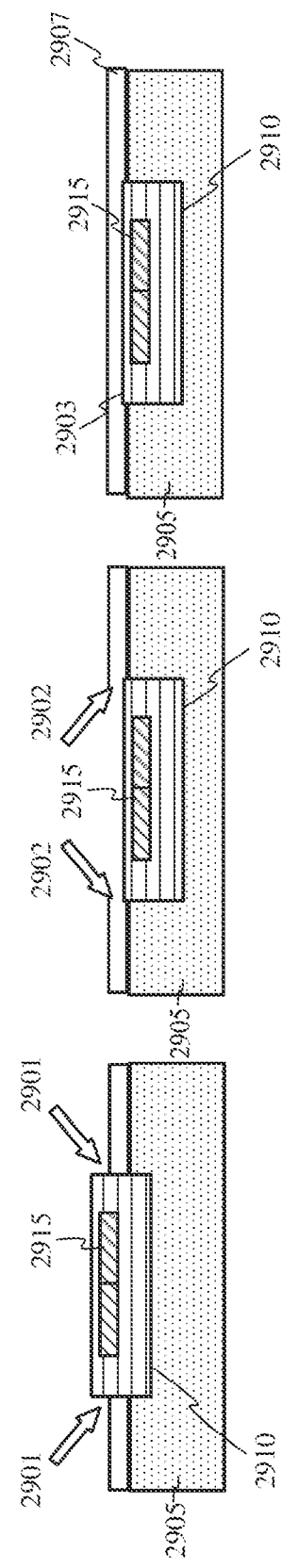
FIG. 29B illustrates several variants of embedding a charging base according to exemplary embodiments of the present invention.

FIG. 29B illustrates a charging base 2910 at least partially embedded below a ground surface 2905 according to an exemplary embodiment of the present invention. The charging base 2910 may include one or more CB antennas 2915 for transmitting or receiving a wireless power signal to/from a corresponding BEV antenna (not shown) associated with a BEV. The charging base 2910 may be protrusive 2901 from the ground, which may improve coupling as the distance between the CB antenna 2915 and BEV antenna may be reduced. A protrusive 2901 charging base 2910 may be more accessible for maintenance and repair. However, a protrusive 2901 charging base 2910 may be an impediment, such as for pedestrians or during snow removal. Alternatively, the charging base 2910 may be flush 2902 with the surface of the ground 2905. A flush 2902 charging base 2910 may be more accessible for maintenance and repair and non-impedimental; however, coupling between the CB antenna 2915 and BEV antenna may be reduced in comparison to the protrusive 2901 charging base 2910. A flush 2902 charging base 2910 may also leave a potential problem with the edge of the ground surface (e.g., asphalt) potentially being more prone to erosion by water, ice and mechanical stress. Alternatively, a charging base 2910 may be located completely below 2903 the surface of the ground (e.g., below the asphalt layer 2907). Such a below-surface 2903 charging base 2910 may be more secure from intruders (e.g., vandalism), and be non-impedimental; however, coupling and accessibility to maintenance and repair may be reduced. With reference to FIG. 29D, a substantially flat cover 3535 with a thin collar 3537 extending over a ground surface 3539 (e.g., asphalt) may be positioned over charging base 2910 and may enable unimpeded road cleaning (e.g., machined road cleaning). Furthermore, cover 3535 may solve the problem described above related to potential erosion of an edge of the ground surface 3539.

Figure 29C:
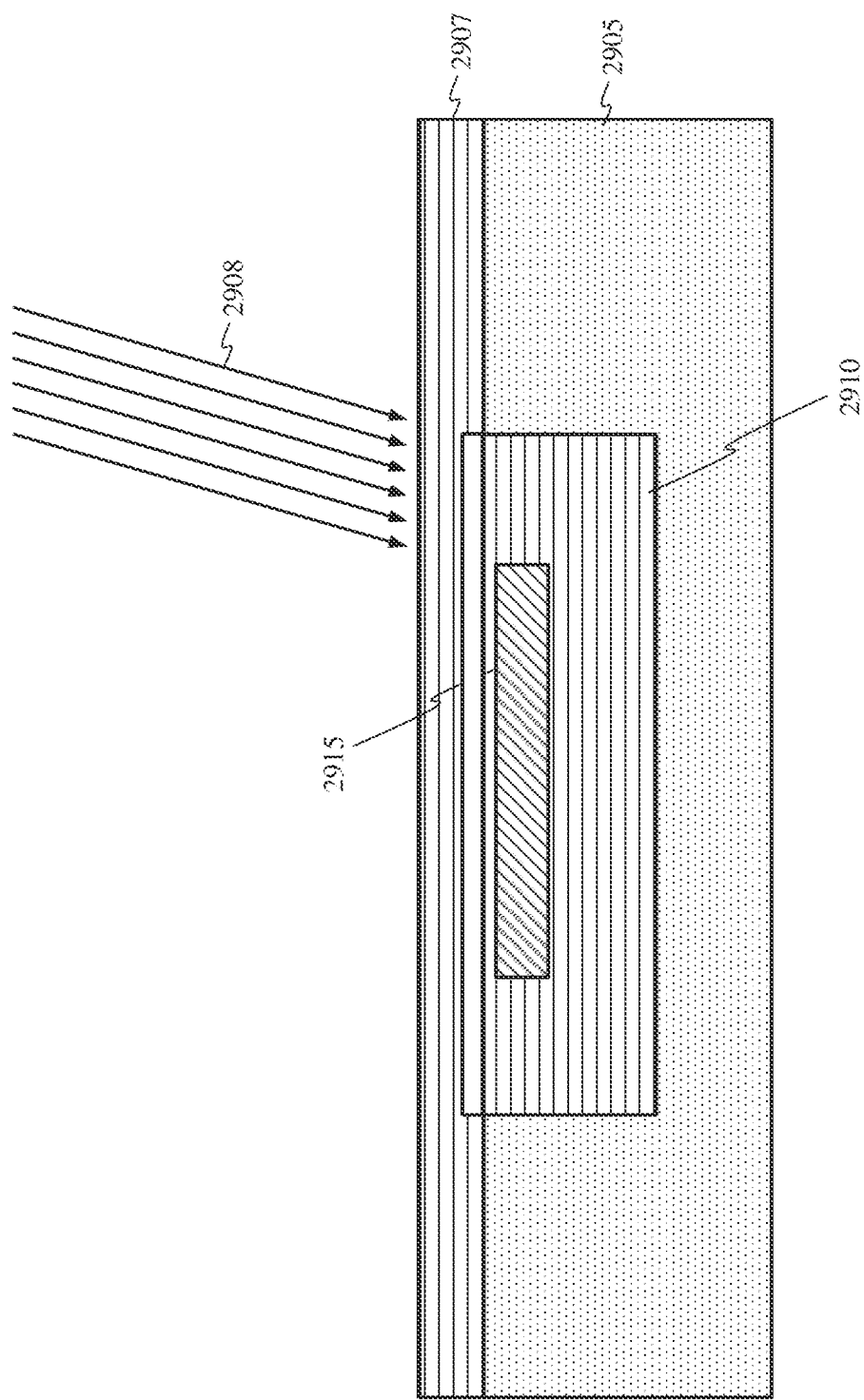
FIG. 29C illustrates a charging base located fully below the surface of the ground according to an exemplary embodiment of the present invention.
Figure 29D:
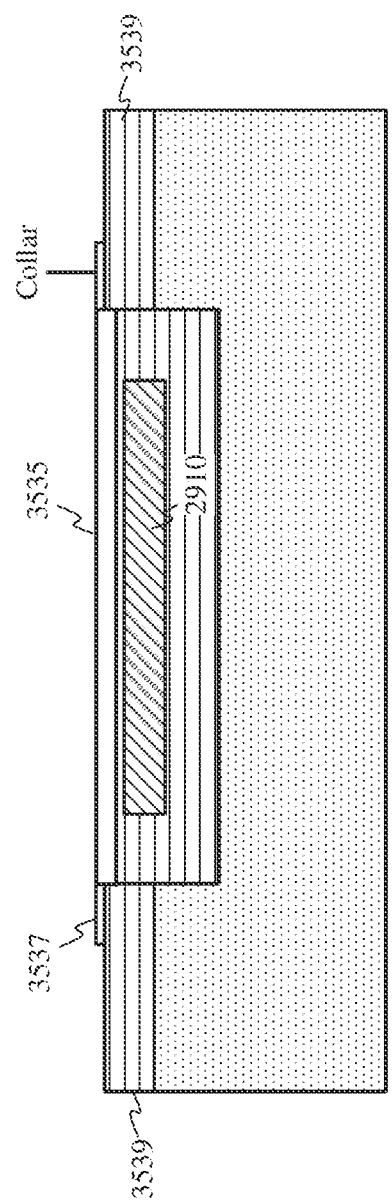
FIG. 29D illustrates a cover with collar positioned over a charging base according to an exemplary embodiment of the present invention.

FIG. 29C further shows a charging base 2910 that is located fully below the surface of the ground 2905 according to an exemplary embodiment of the present invention. The charging base 2910 may be configured to protect the wireless power antenna 2915 from environmental factors 2908, such as heat, cold, solar radiation, water, moisture, debris, etc. For example, such a fully embedded charging base may be hermetically sealed in order to be water proof.

Figure 30A:
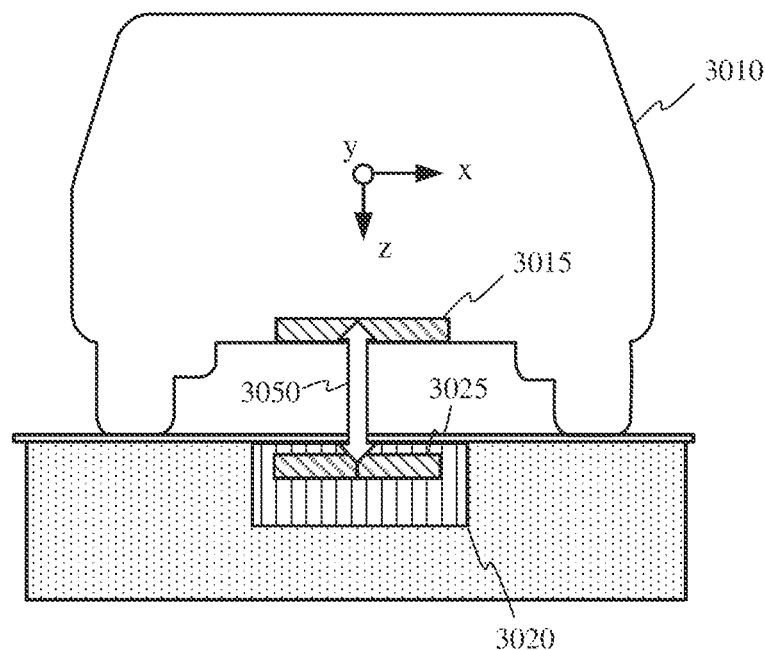
FIG. 30A-30C illustrate a vehicle including a wireless power antenna positioned over a charging base including a wireless power antenna according to an exemplary embodiment of the present invention.
Figure 30B:
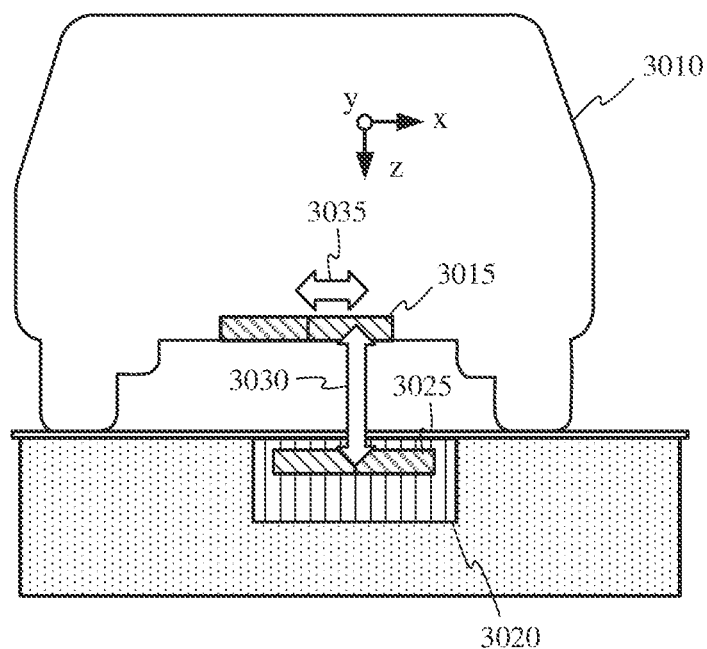
Figure 30C:
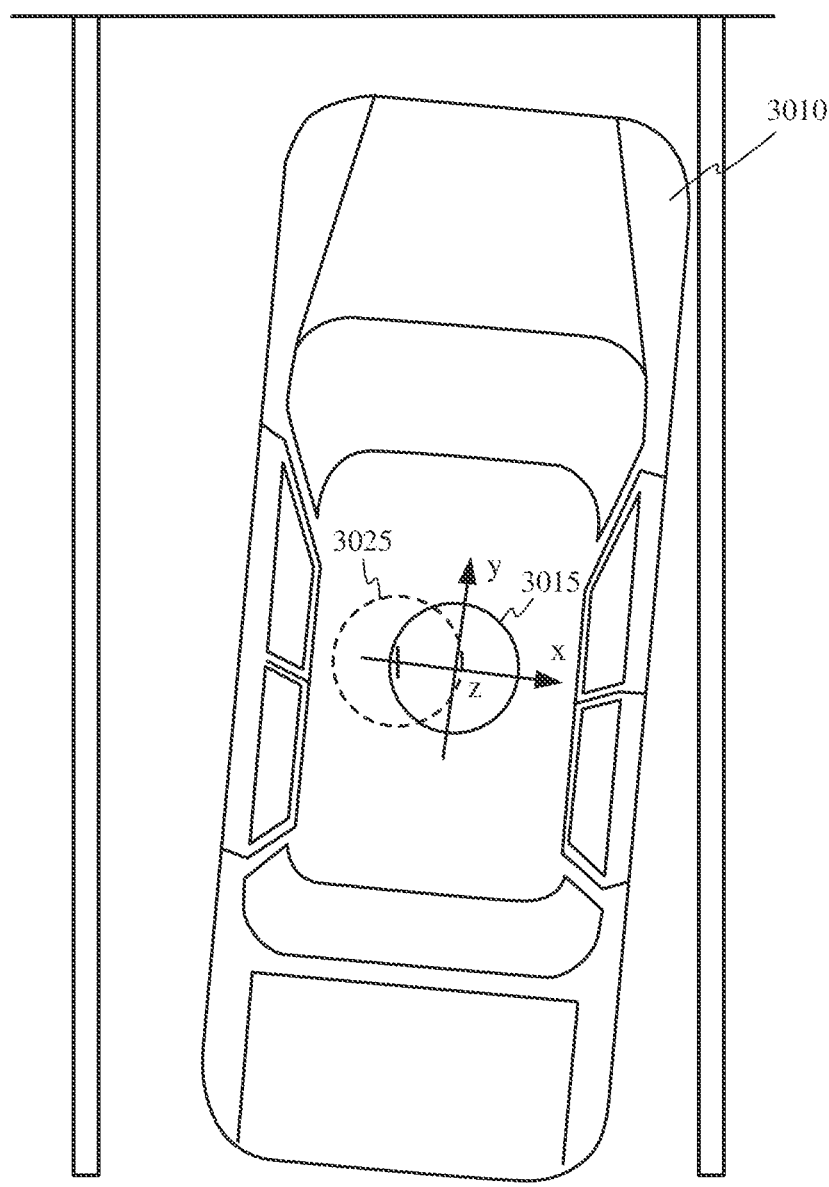
Figure 31A:
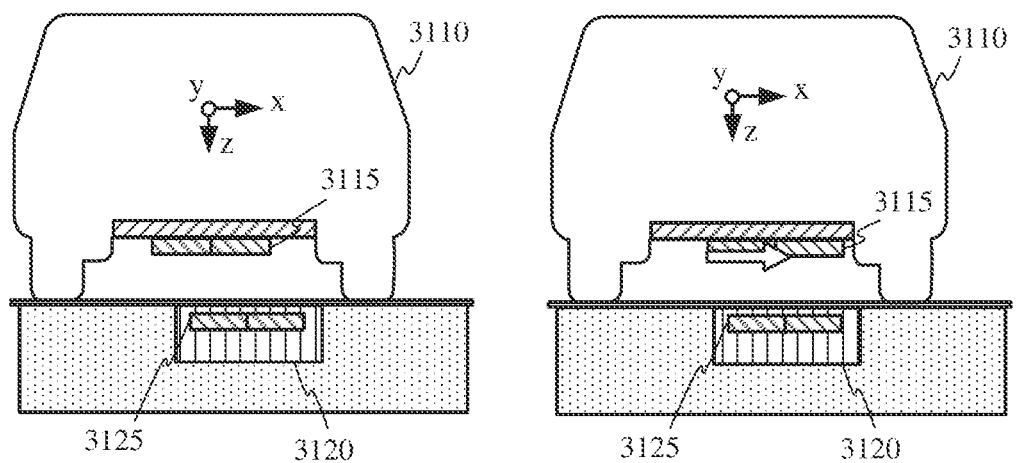
FIGS. 31A-31G illustrate several variants for fine alignment adjustment according to various exemplary embodiments of the present invention.
Figure 31B:
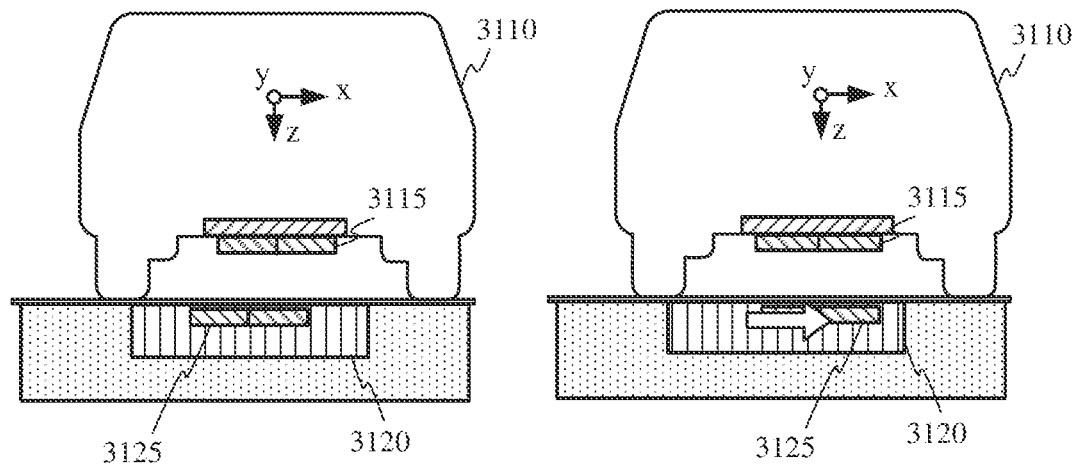
Figure 31C:
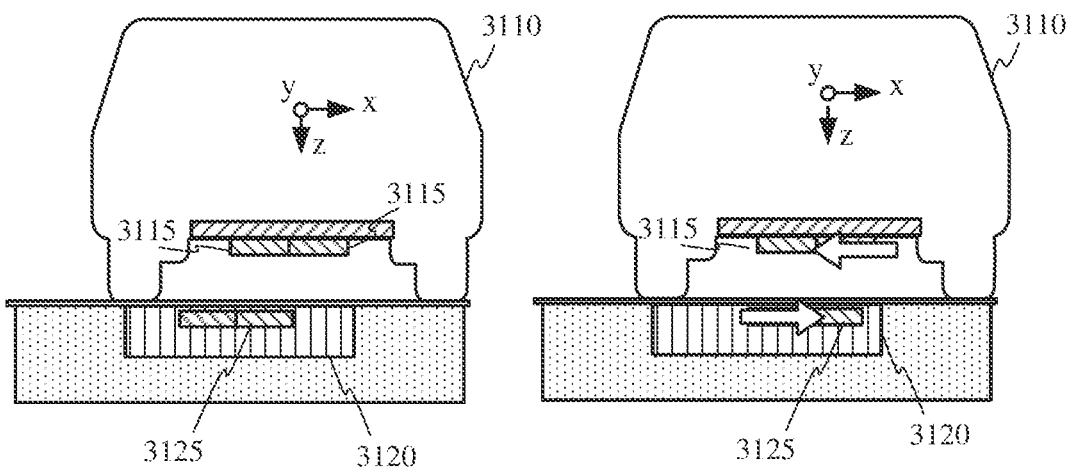
Figure 31D:
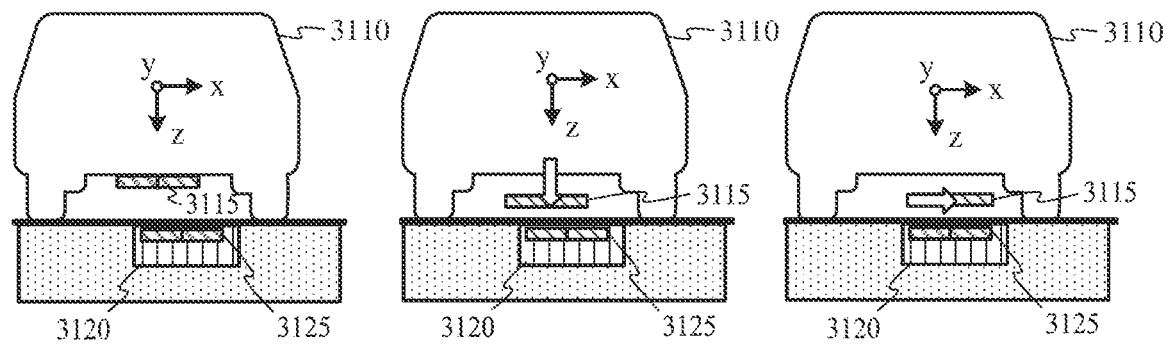
Figure 31E:
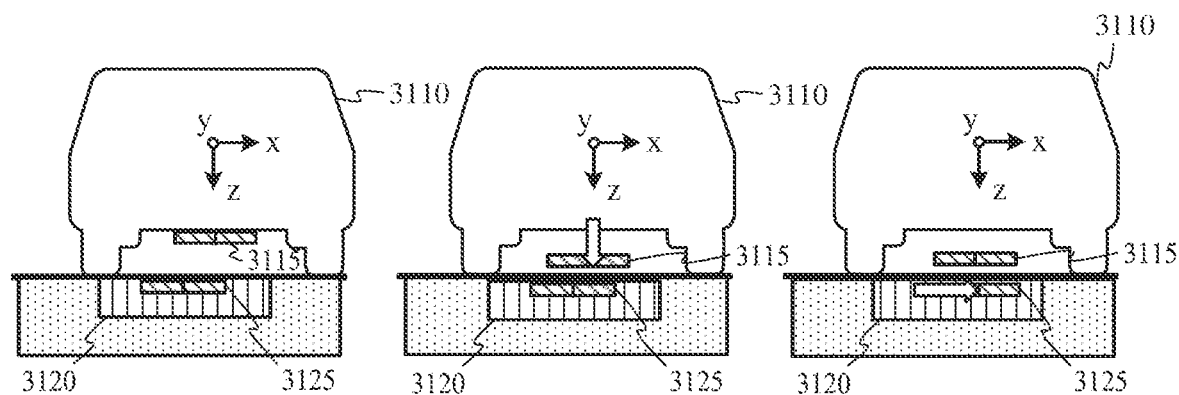
Figure 31F:
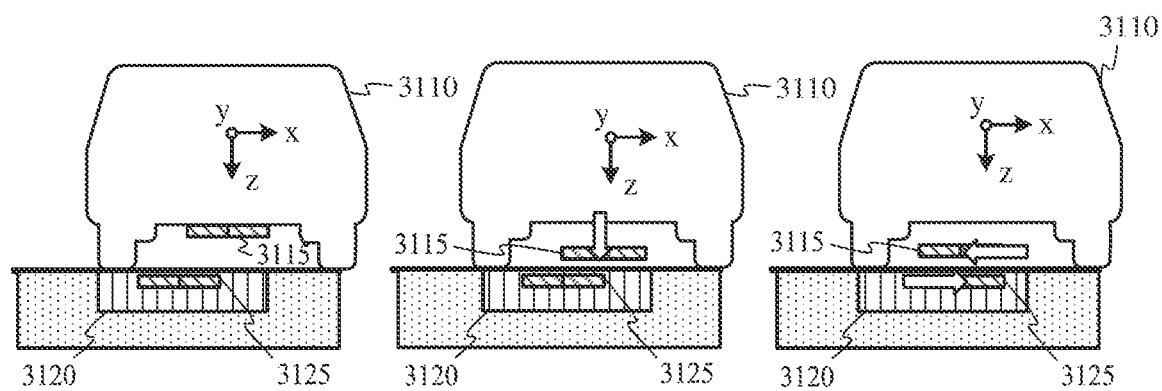
Figure 31G:
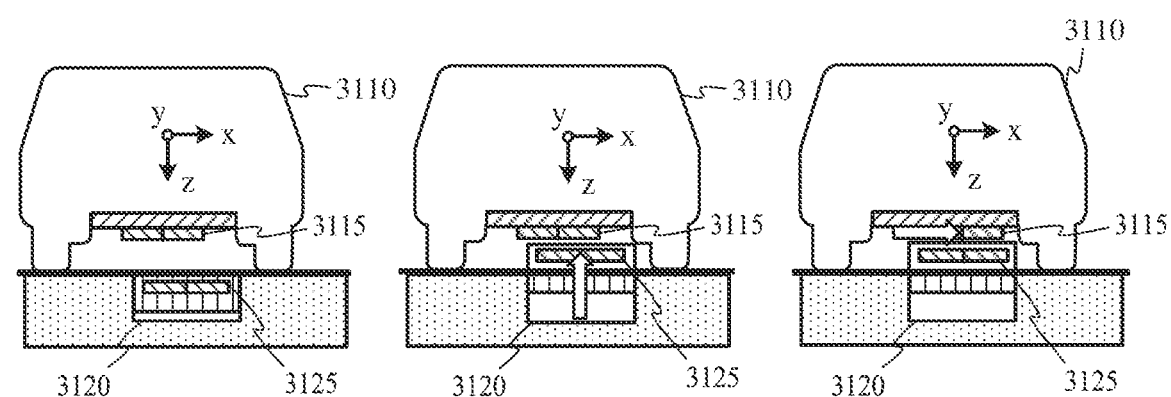

FIG. 30A-30C illustrate a BEV 3010 including a wireless power antenna 3015 positioned over a charging base 3020 also including a wireless power antenna 3025. As shown in FIG. 30, the BEV antenna 3010 and the CB antenna 3025 are aligned in the X and Y directions, and separated by a distance 3030 in the Z direction. As shown in FIG. 30B, the BEV antenna 3010 and the CB antenna 3025 are misaligned by an offset distance 3035 in the X direction, and are separated by a distance 3030 in the Z direction.

It may be desirable to reduce the distance 3030 and the offset distance 3035 in order to improve coupling strength between the BEV antenna 3015 and the CB antenna 3025. Reducing the distance 3030 and the offset distance 3035 may occur through a fine alignment adjustment system.

The fine alignment adjustment system may be used to adjust the physical position of the CB antenna 3025, the BEV antenna 3015, or a combination thereof in order to increase coupling strength between the CB antenna 3025 and the BEV antenna 3015. Adjusting the position of one or both of the BEV antenna 3015 and CB antenna 3025 may be performed in response to a detection of misalignment therebetween. Determining misalignment may be performed by utilizing information from the vehicle guidance system, as described above, such as for the methods related to magnetic field detection. Furthermore, information from a wireless power link (e.g., various parameters indicative of the performance of the wireless power link) may be used in determining misalignment of associated antennas. For example, during misalignment detection, the wireless power link may be operated at a reduced power level and after associated antennas have been accurately aligned, the power level may be increased.

The fine alignment adjustment system may be separate from, or in addition to the course alignment guidance system. For example, the course alignment guidance system may guide a BEV into a position within a given tolerance (i.e., error radius), such that a fine alignment adjustment system can correct for fine errors between the BEV antenna 3015 and the CB antenna 3025.

As shown in the overhead view of BEV 3010 in FIG. 30C, the BEV antenna 3010 and the CB antenna 3025 are misaligned only in the X direction. The BEV antenna 3010 and CB antenna 3020 are aligned in the Y direction. For example, the alignment in the Y direction may have been accomplished by the BEV 3010 using its own traction system, which may be assisted (e.g., auto-piloted) by the guidance system described herein, and by which the BEV's motor may be able to move smoothly and accurately to a target Y position. In such a scenario, alignment error in the X direction may still exist but not in the Y direction. Eliminating the need for alignment adjustment in the Y direction (e.g., through use of a course alignment guidance system) may also reduce space requirements for BEV antenna 3015 as the BEV antenna 3015 may be configured to move only in X direction, which may be accommodated in a cavity and not deployed for wireless power transfer. Thus, eliminating the need for fine alignment in the Y direction may simplify the BEV wireless power subsystem.

FIGS. 31A-31G illustrate several variants for fine alignment adjustment according to various exemplary embodiments of the present invention. As shown by FIGS. 31A-31G, the physical position of the BEV antenna 3115 may be adjusted to correct for alignment errors in the X, Y, and Z directions, or any combination thereof. Additionally, the position of the CB antenna 3125 may be adjusted to correct for alignment errors in the X, Y, and Z directions, or any combination thereof. In some exemplary embodiments, the positions of both the BEV antenna 3115, and the CB antenna 3125 may be adjusted to correct for alignment errors in any of the X, Y, and Z directions, or any combination thereof.

Stated another way, during coupling wireless power between a CB antenna 3125 and a BEV antenna 3115 associated with a battery unit of a BEV 3110, the position of at least one of the CB antenna 3125 and the BEV antenna 3115 may be adjusted. The adjustment of position may be initiated in response to a detection of misalignment between the CB antenna 3125 and the BEV antenna 3115. A charging base 3120 may include a wireless power transmitter configured to transmit the wireless power signal, and a CB antenna 3125 operably coupled with the wireless power transmitter. One or more mechanical devices may be used for adjusting the position of the BEV antenna 3115 and/or the CB antenna 3125 in at least one of an X, Y, and Z direction.

Figure 32:
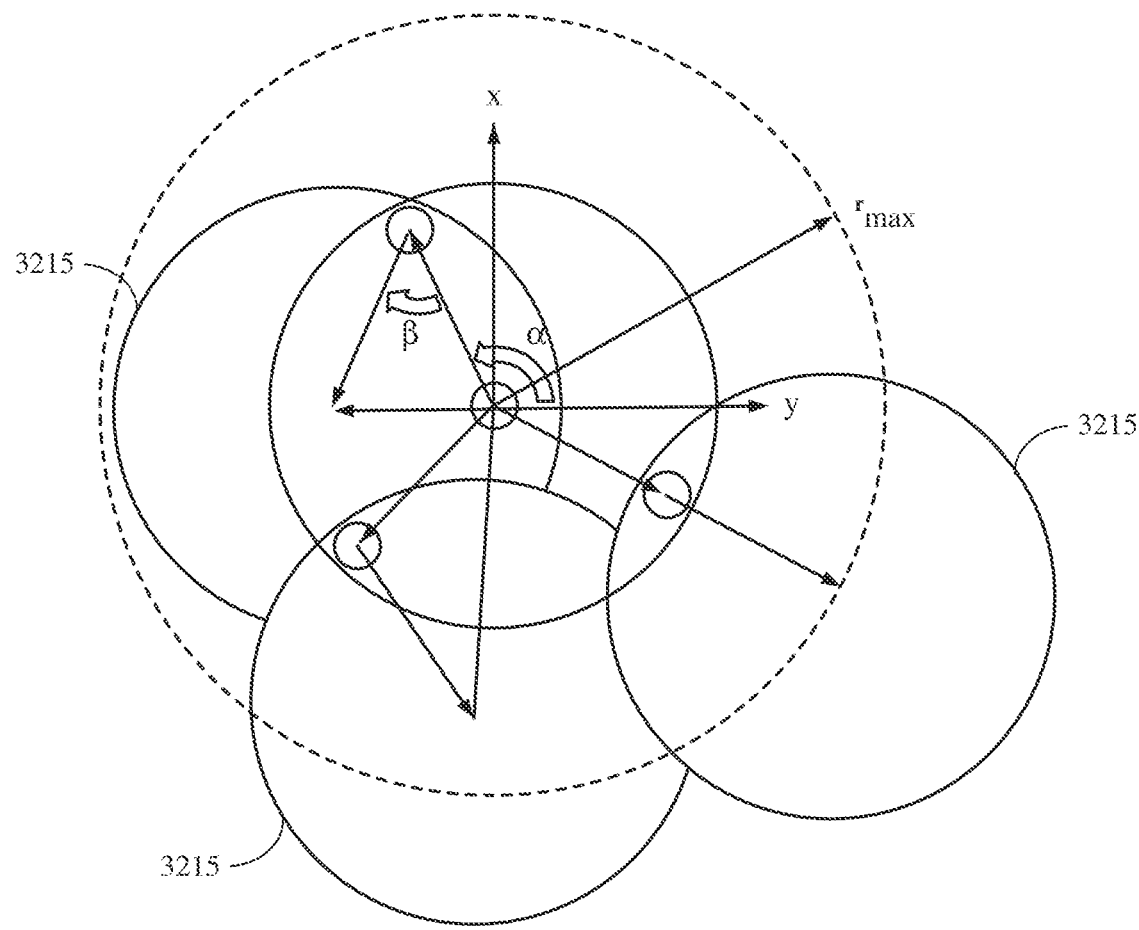
FIG. 32 illustrates possible locations in the X and Y direction that a mechanical device may adjust the position of a wireless power antenna according to an exemplary embodiment of the present invention.

FIG. 32 illustrates possible locations in the X and Y direction that a mechanical device may adjust the position of a BEV antenna according to an exemplary embodiment of the present invention. For example, by selecting an angle pair (α, β) within the mechanical device, any position in the X and Y directions may be achieved within a radius $r_{max}$.

Figure 33:
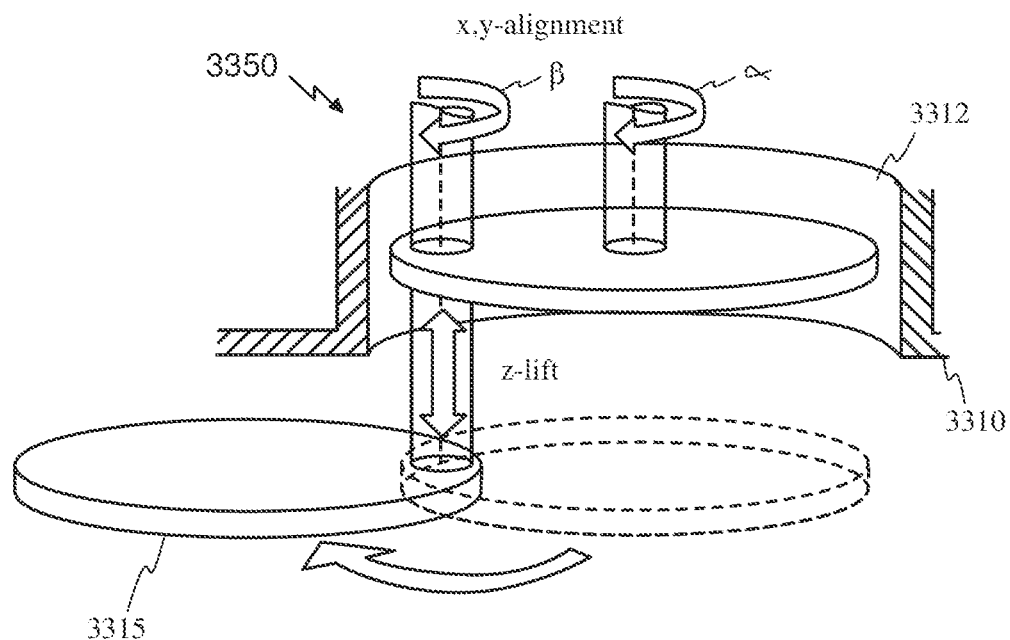
FIG. 33 illustrates a mechanical solution for a wireless power antenna that is located within a cavity of the underside of a vehicle according to an exemplary embodiment of the present invention.

FIG. 33 illustrates a mechanical solution for a BEV antenna 3315 that is located within a cavity 3312 of the underside of a BEV 3310 according to an exemplary embodiment of the present invention. As shown in FIG. 33, mechanical device 3350 may adjust the position of the BEV antenna 3315 in the X and Y directions by selecting an appropriate angle pair (α, β). Additionally, mechanical device 3350 may adjust the position of the BEV antenna 3315 in the Z direction by lowering the BEV antenna 3315 from the cavity 3312 of the BEV 3310. Mechanical device 3350 may include one of many mechanical solutions including electric driven mechanics and/or hydraulics. Although not shown herein, a mechanical device may similarly be used to adjust the position of the CB antenna in the X, Y, or Z directions, or any combination thereof. In other words, fine alignment adjustment may be accomplished with a mechanical solution for adjusting the position of the CB antenna, the BEV antenna 3315, or both, as the case may be. Some mechanical solutions may experience failure and may require some maintenance or repair.

Figure 34:
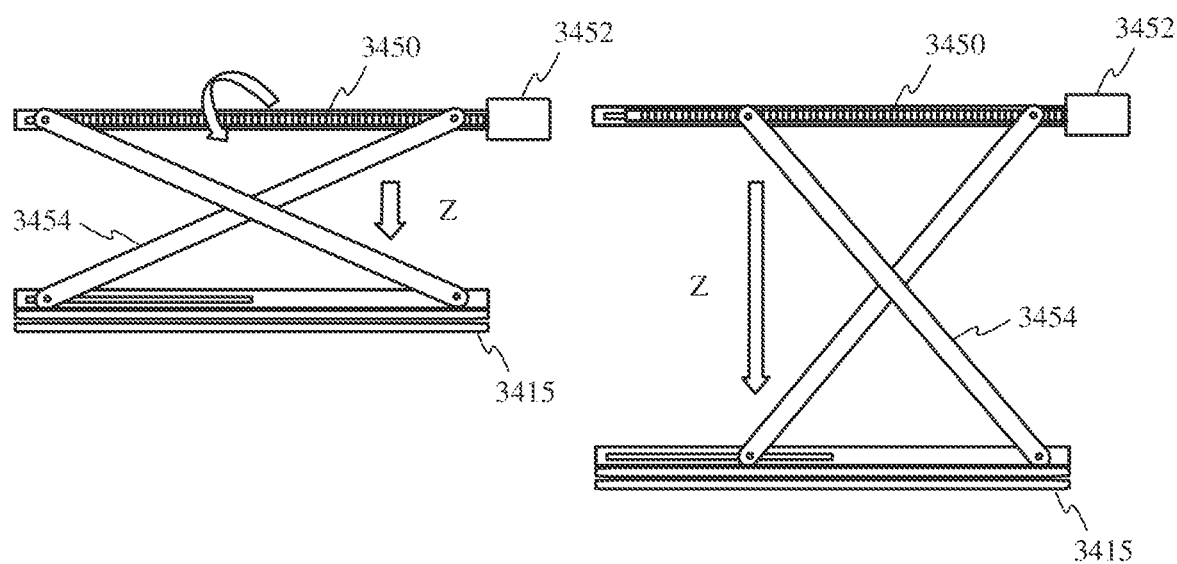
FIG. 34 illustrates another mechanical solution in which the wireless power antenna may be repositioned by a gear shaft operably coupled to a drive mechanism according to an exemplary embodiment of the present invention.

FIG. 34 illustrates another mechanical solution in which the BEV antenna 3415 (and/or CB antenna) may be repositioned by a gear shaft 3450 operably coupled to a drive mechanism 3452 according to an exemplary embodiment of the present invention. In operation, if the drive mechanism 3452 is actuated, the gear shaft 3450 may be rotated to extend the support member 3454 in order to lower the BEV antenna 3415 in the Z direction.

Figure 35A:
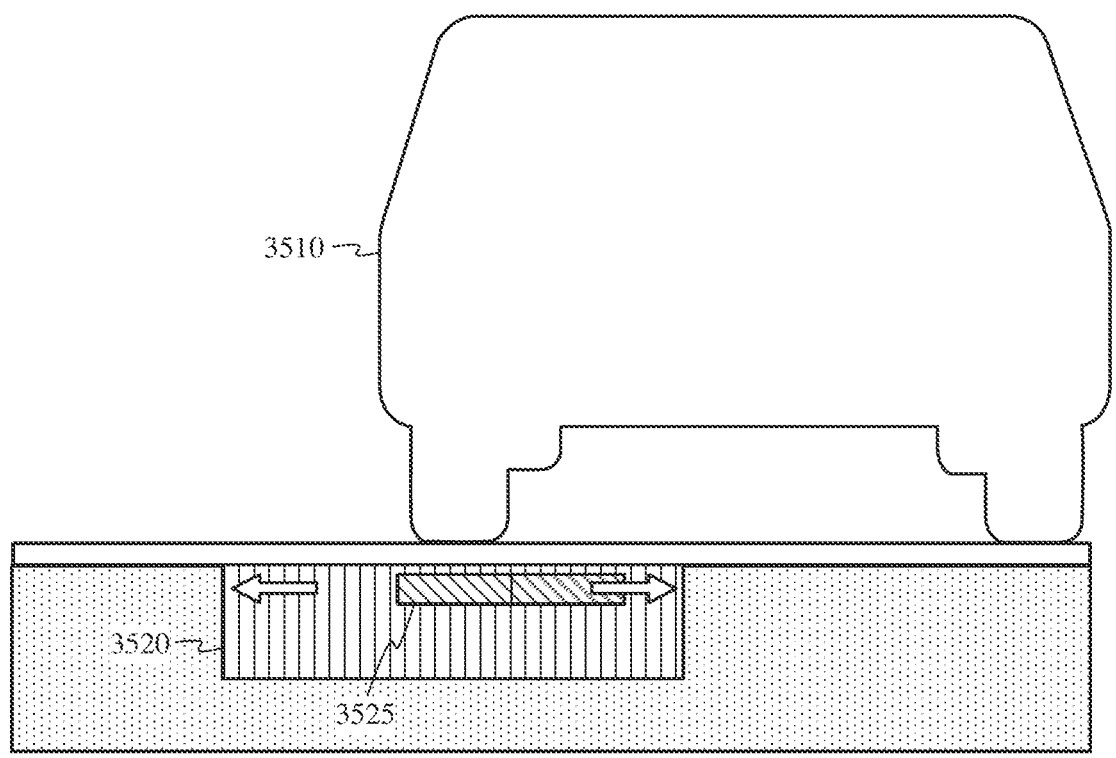
FIG. 35A illustrates a charging base 3520 experiencing heavy loading from the weight of a vehicle.
Figure 35B:
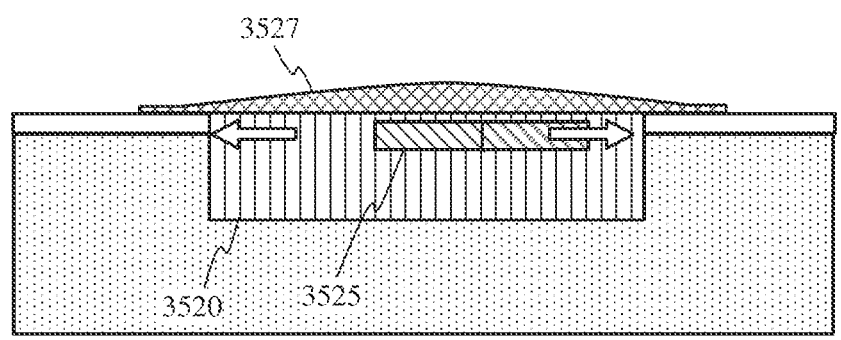
FIGS. 35B and 35C illustrate a charging base including a reinforced cover according to an exemplary embodiment of the present invention.
Figure 35C:
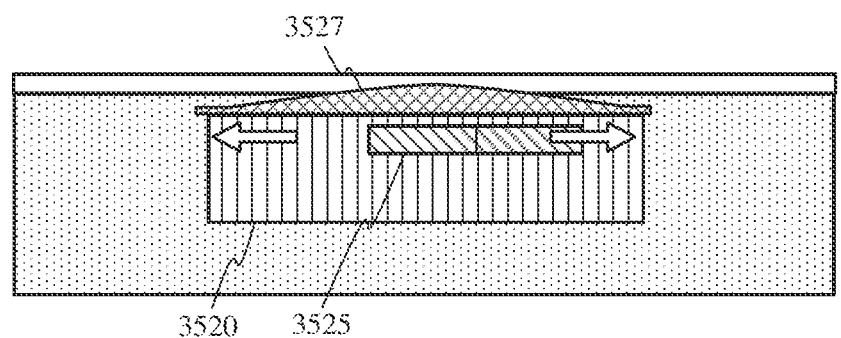

As shown in FIG. 35A, a charging base 3520 may experience heavy loading from the weight of a BEV 3510. Therefore, it may be desirable for the charging base 3520 to further include a reinforced cover 3527. FIGS. 35B and 35C illustrate a charging base 3520 including a reinforced cover according to an exemplary embodiment of the present invention. A reinforced cover 3527 may be located above the surface of the ground as shown in FIG. 35B, or below the surface of the ground as shown in FIG. 35C. The reinforced cover 3527 may increase the distance from a BEV antenna than would otherwise occur with a charging base 3520 not including the reinforced cover. Being above the surface of the ground may improve accessibility for maintenance and repair, but may also be an obstruction (e.g., for pedestrians, snow clearance, etc.). In an exemplary embodiment with the CB antenna 3525 located within an embedded charging base 3520 and with the CB antenna 3525 configured to be movable within the embedded charging base 3520, it may be desirable for the charging base 3520 to be enlarged in comparison to a charging base with a stationary CB antenna.

Up to this point a wireless power charging and antenna alignment system for a BEV has been shown to move only the BEV antenna in the X, Y, and Z directions. FIGS. 36A-36D illustrate a BEV 3610 including a wireless power battery unit 3630 and the BEV antenna 3615 configured to be repositioned in the X, Y, and Z directions in various combinations according to an exemplary embodiment of the present invention. The battery unit may be located within a cavity of the BEV 3610. Additionally, the BEV antenna 3615 may be located within a cavity of the battery unit 3630. Adjusting the position of the entire battery unit 3630 (e.g., in the Z direction) to accommodate antenna alignment, decrease the distance between the antennas, or both, may improve coupling between the CB antenna 3625 and BEV antenna 3615.

Figure 36A:
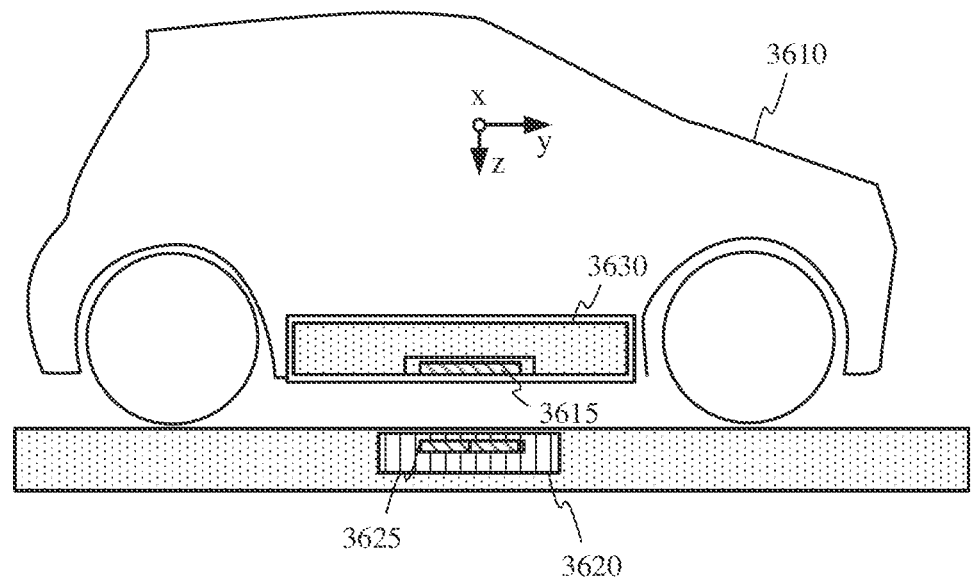
FIGS. 36A-36D illustrate a vehicle including a wireless power battery unit and the wireless power antenna configured to be repositioned in the X, Y, and Z directions in various combinations according to an exemplary embodiment of the present invention.
Figure 36B:
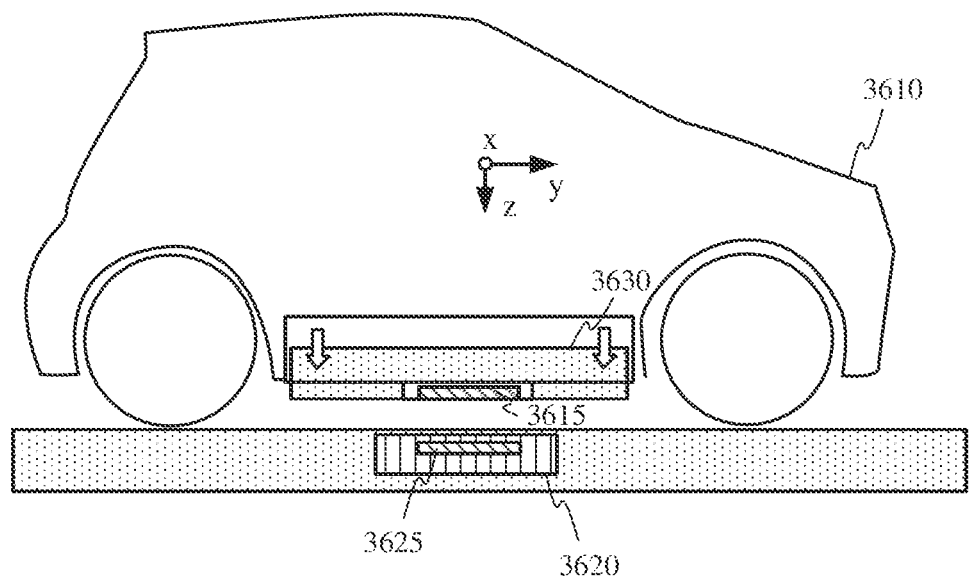
Figure 36C:
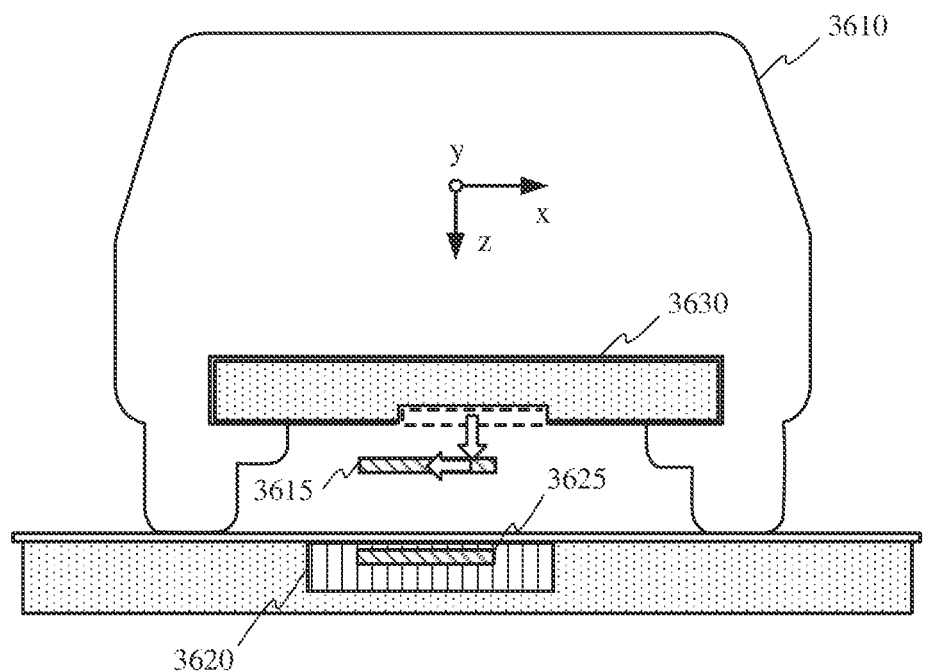
Figure 36D:
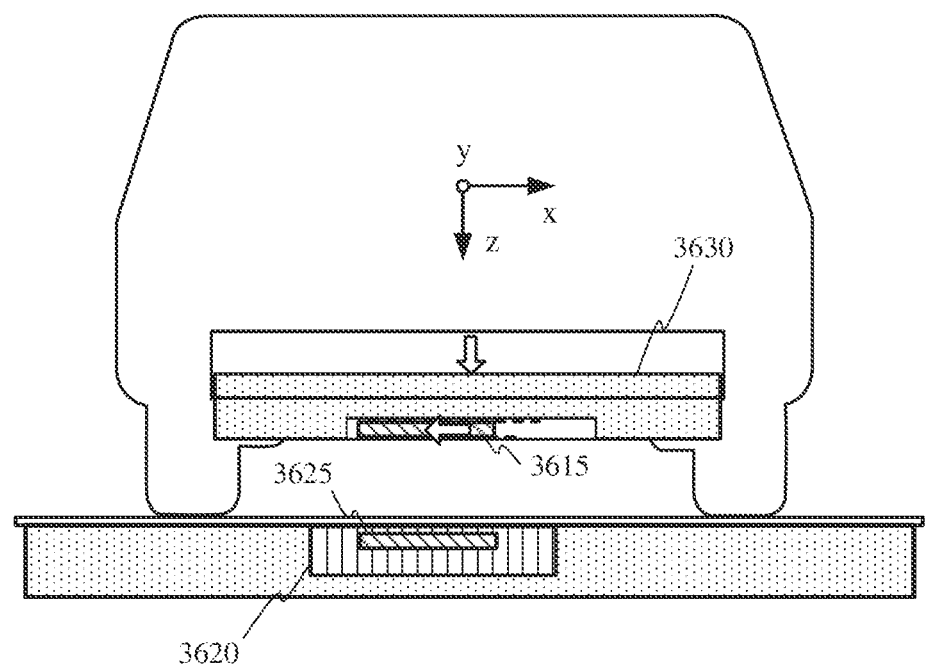

For example, the position of the battery unit may 3630 may be adjusted in one or more directions (FIG. 36B). The BEV antenna 3615 may be moved in the X, Y, and Z directions (FIG. 36C). Additionally, both the battery unit 3630 and the BEV antenna 3615 can be moved in the X, Y, and Z directions in various combinations (FIG. 36D). Like with the examples discussing adjusting the position of an antenna, adjusting the position of the battery unit 3630 may be accomplished through mechanical devices (e.g., through electric driven mechanics and/or hydraulics).

The fine alignment adjustment may also accomplished with the assistance of an electrical solution (e.g., electronically switched coil arrays) altering the flux lines of the electric field generated by the wireless power transmitter. A combination of mechanical and electrical alignment of the antennas may be used.

The fine alignment adjustment may also be performed using the BEV's 3610 own traction system, which may configured to have the motor move the BEV 3610 smoothly and accurately (e.g., by moving the BEV 3610 back and forth in a zig-zag motion) to enhance coupling between coupling between the CB antenna 3625 and BEV antenna 3615. This zig-zag motion may be performed fully automatically by the BEV 3610 without, or with only minimum, operator intervention. For example, the BEV 3610 may be equipped with a servo steering wheel, ultrasonic sensors, and artificial intelligence. In this case the BEV antenna 3615 may be fixed, and adjustment of the BEV antenna 3615 through other mechanical or electrical solutions may not be required. In other words, the BEV antenna 3615 is in a fixed position in at least one of the X, Y, and Z directions (or all directions) in relation to the BEV 3610, and the mechanical device used to adjust the position of the BEV antenna 3615 includes the motor of the BEV 3610 configured for controllably positioning the BEV 3610 for adjusting the position of the BEV antenna 3615 in at least one of the X, Y, and Z directions.

Stated another way, a wireless power alignment system for a vehicle may comprise a wireless power receiver configured to receive a wireless power signal, the wireless power receiver may be operably coupled with a battery unit 3630 of a BEV 3610. The BEV antenna 3615 may be operably coupled with the wireless power receiver, and at least one mechanical device may be configured for adjusting a position of the BEV antenna 3615 in at least one of an X, Y, and Z direction. Adjusting a position of the BEV antenna may be in response to a detection of misalignment between the BEV antenna 3615 and a CB antenna 3625.

Figure 37A:
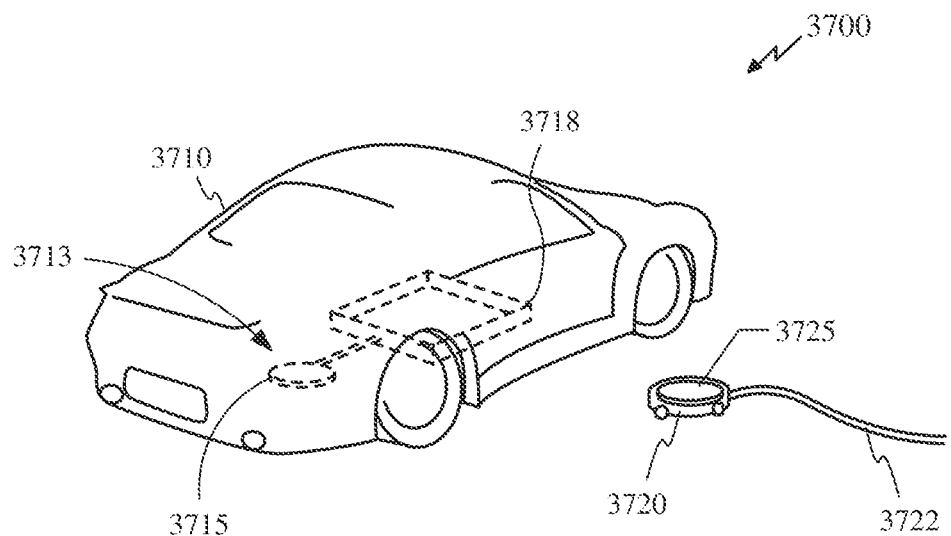
FIG. 37A-37B illustrate a fine alignment adjustment system for a wireless power charging system for a vehicle according to an alternative exemplary embodiment of the present invention.
Figure 37B:
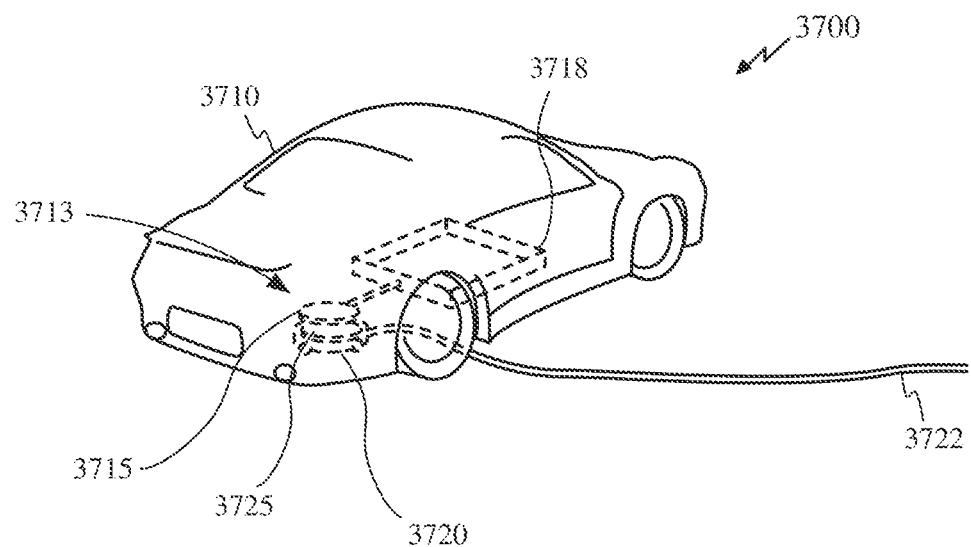

FIG. 37 illustrates fine alignment adjustment for a wireless power charging system 3700 for a BEV 3710 according to an alternative exemplary embodiment of the present invention. Wireless power system 3700 includes a BEV 3710 associated with a BEV side wireless power subsystem 3713 operably coupled to a power supply 3718 (e.g., battery). The BEV wireless power subsystem 3713 may include a BEV power converter (not shown) operably coupled with a BEV antenna 3715. The BEV antenna 3715 may be located along the underside of the chassis of BEV 3710. The wireless power system 3700 for a BEV 3710 further includes a charging base 3720 including a CB power conversion (not shown) operably coupled with a BEV antenna 3725. Rather than the charging base 3720 being at least partially embedded below the surface of the ground as previously described, charging base 3720 may be configured as a charging platform located above the surface of the ground. Such a configuration may be desirable as a retrofit solution for a garage or carport if forming a hole in the ground for a charging base is undesired. A configuration of a charging platform may also provide flexibility as the charging platform may mobile and able to be stored in a location other than a garage or transferred to another location.

The charging base 3720 (e.g., charging platform) may be configured to move automatically (e.g., as an automated robot), be controlled remotely (e.g., via a remote control unit), or through other methods for control of a mobile charging platform. For example, the BEV 3710 (e.g., through its wireless power subsystem 3713) may request a charge, whereupon the charging base 3720 may move automatically underneath the BEV 3710 and position itself to align the CB wireless power antenna 3725 with the BEV antenna 3715. Further fine alignment (if necessary) may be accomplished through adjusting the position of the BEV antenna 3715 and CB antenna 3725 in one or more direction as previously described.

Once sufficiently aligned, charging base 3720 may more efficiently transfer wireless power between a charging base and a wireless power subsystem 3713 of the BEV 3710. After charging is completed, or after some other event, the charging base 3720 may return back to a waiting position (standby mode). The wireless power system 3700 may, therefore, include a communication link with the charging base 3720 and another device (e.g., wireless power subsystem 3713) associated with the BEV 3710. The charging base 3720 may further include cable management in order to uncoil and coil a connecting cable 3722 prior to and after the charging process.

A wireless power charging system for a BEV may be further configured for safety and security concerns. For example, the BEV may be configured to be immobilized when the wireless power BEV or CB antennas are deployed, when such antennas cannot be retracted (e.g., due to damage or obstacle). Such immobilization may protect the wireless power charging system from further damage. The wireless power charging system may further include sensors that detect mechanical resistance of the wireless power BEV or CB antennas. Detecting mechanical resistance may protect the wireless power BEV or CB antennas and accompanying components from being damaged if an obstacle (stone, debris, snow, animal, etc.) is positioned in a location that would restrict the movement of the antenna.

The wireless power charging system may further include continuous monitoring of the wireless power link between the BEV antenna and CB antenna (e.g., monitoring voltages, currents, power flow, etc.) and reduce the power transmitted or shut down power in the event of detection of an abnormality in the wireless power link. The wireless power charging system may further include sensors configured to detect the presence of persons or animals in close proximity of the antenna. Such sensors may be desirable in order for a processor to reduce or terminate wireless power transmission if a person is proximate the wireless power antennas. Such an action may be a safety precaution against prolonged exposure to electromagnetic radiation, such as for example, while a person performs maintenance or other repair work underneath the BEV particularly for persons using cardiac pacemakers or similar sensitive and safety critical medical devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus, comprising:
a wireless power charging base to be positioned within a vehicle parking space defining a first plane, wherein the wireless power charging base comprises:
a first antenna configured to generate a first magnetic field at a first frequency to transfer power to an electric vehicle, and
a second antenna configured to generate a second magnetic field at a second frequency for guiding the electric vehicle within the vehicle parking space and for causing a vehicle base of the electric vehicle to align with the wireless power charging base,
wherein the second antenna comprises:
a first antenna element comprising a loop in a second plane perpendicular to the first plane, and
a second antenna element comprising a loop in a third plane parallel to the first plane; and
the wireless power charging base is configured to emit a beacon signal including an identification signal.

2. The apparatus of claim 1, wherein the first antenna element of the second antenna is configured to generate the second magnetic field as a polarized magnetic field.

3. The apparatus of claim 1, wherein the second antenna element of the second antenna is configured to generate a third magnetic field having a horizontal field vector component pointing toward the source of the third magnetic field.

4. The apparatus of claim 1, wherein the first antenna is further configured to wirelessly receive power from the electric vehicle.

5. The apparatus of claim 1, wherein the second frequency is in a frequency band different from the first frequency.

6. The apparatus of claim 1, wherein the second antenna element of the second antenna is configured to generate a third magnetic field at a third frequency in a frequency band different from the first frequency.

7. The apparatus of claim 1, wherein the identification signal is modulated into the second magnetic field.

8. The apparatus of claim 1, wherein the wireless power charging base is flush with a surface of the vehicle parking space or embedded below the surface.

9. The apparatus of claim 1, wherein the wireless power charging base is a mobile charging platform configured to move autonomously.

10. An apparatus, comprising:
a wireless power charging base to be positioned within a vehicle parking space defining a first plane, wherein the wireless power charging base comprises:
a first antenna configured to generate a first magnetic field to transfer power to an electric vehicle at a first frequency, and a second antenna configured to generate a second magnetic field at a second frequency for guiding the electric vehicle within the vehicle parking space and for causing a vehicle base of the electric vehicle to align with the wireless power charging base, wherein the second antenna comprises:
a first antenna element comprising a loop in a plane perpendicular to the first plane and configured to generate the second magnetic field as a polarized magnetic field; and the wireless power charging base is configured to emit a beacon signal including an identification signal.

11. The apparatus of claim 10, wherein the second frequency is in a frequency band different from the first frequency.

12. The apparatus of claim 10, wherein the identification signal is modulated into the second magnetic field.

13. An apparatus, comprising:
a wireless power charging base to be positioned within a vehicle parking space defining a first plane, wherein the wireless power charging base comprises:
a first antenna configured to generate a first magnetic field to transfer power to an electric vehicle at a first frequency, and
a second antenna configured to generate a second magnetic field at a second frequency for guiding the electric vehicle within the vehicle parking space and for causing a vehicle base of the electric vehicle to align with the wireless power charging base,
wherein the second antenna comprises:
a first antenna element forming a loop in a plane parallel to the first plane and configured to cause the second magnetic field to include a horizontal field vector component pointing toward the source of the second magnetic field; and
the wireless power charging base is configured to emit a beacon signal including an identification signal.

14. The apparatus of claim 13, wherein the second frequency is in a frequency band different from the first frequency.

15. The apparatus of claim 13, wherein the identification signal is modulated into the second magnetic field.

16. A method of guiding an electric vehicle, the method comprising:
using a first antenna to generate a first magnetic field at a first frequency to transfer power from a wireless power charging base located within a vehicle parking space defining a first plane to the electric vehicle; and
using a second antenna to generate a second magnetic field at a second frequency and a third magnetic field at a third frequency, at least one of the second magnetic field and the third magnetic field for guiding the electric vehicle within the vehicle parking space and for causing a vehicle base of the electric vehicle to align with the wireless power charging base,
wherein:
generating the second magnetic field comprises using a first antenna element comprising a loop in a second plane perpendicular to the first plane to generate a polarized magnetic field, and
generating the third magnetic field comprises using a second antenna element comprising a loop in a third plane parallel to the first plane to generate a horizontal field vector component pointing toward the source of the third magnetic field; and
the method further comprises emitting a beacon signal including an identification signal from the wireless power charging base.

17. The method of claim 16, wherein the second frequency is in a frequency band different from the first frequency.

18. The method of claim 16, wherein the third frequency is in a frequency band different from the first frequency.

19. The method of claim 16, wherein emitting the beacon signal comprises modulating the identification signal into the second magnetic field.

* * * * *